United States Patent
Kim et al.

(10) Patent No.: US 10,057,650 B2
(45) Date of Patent: Aug. 21, 2018

(54) MOBILE TERMINAL AND METHOD FOR CONTROLLING THE SAME

(71) Applicant: LG ELECTRONICS INC., Seoul (KR)

(72) Inventors: Suhwang Kim, Seoul (KR); Jonghoon Seo, Seoul (KR); Soonwon Hong, Seoul (KR); Hongbin Yang, Seoul (KR); Jeonghun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

(21) Appl. No.: 15/339,213

(22) Filed: Oct. 31, 2016

(65) Prior Publication Data

US 2017/0150227 A1    May 25, 2017

(30) Foreign Application Priority Data

Nov. 19, 2015 (KR) .......... 10-2015-0162864

(51) Int. Cl.
| | |
|---|---|
| *H04N 5/445* | (2011.01) |
| *H04N 21/478* | (2011.01) |
| *H04N 21/41* | (2011.01) |
| *H04N 21/422* | (2011.01) |
| *H04N 21/431* | (2011.01) |
| *H04N 21/436* | (2011.01) |
| *H04N 21/4415* | (2011.01) |
| *G06Q 20/32* | (2012.01) |

(52) U.S. Cl.
CPC ....... *H04N 21/47815* (2013.01); *G06Q 20/32* (2013.01); *G06Q 20/3278* (2013.01); *H04N 21/4126* (2013.01); *H04N 21/42221* (2013.01); *H04N 21/4316* (2013.01); *H04N 21/43615* (2013.01); *H04N 21/4415* (2013.01)

(58) Field of Classification Search
CPC ........ H04N 21/47815; H04N 21/4126; H04N 21/43615; H04N 21/4316; H04N 21/42221; H04N 21/4415
See application file for complete search history.

(56) References Cited

U.S. PATENT DOCUMENTS 5,498,003 A * 3/1996 Gechter .................. A63F 13/52
                                                              463/1
5,715,416 A * 2/1998 Baker .................. G06F 3/0481
                                                          707/E17.01
(Continued)

FOREIGN PATENT DOCUMENTS

EP         2 682 859 A2    1/2014
KR      2014-0118193       10/2014

OTHER PUBLICATIONS

European Search Report issued in Application 16189411.8 dated Mar. 10, 2017.
(Continued)

*Primary Examiner* — Michael B Pierorazio
(74) *Attorney, Agent, or Firm* — KED & Associates LLP

(57) ABSTRACT

Disclosed herein are an electronic device and a method for controlling the electronic device. In an aspect, when a mirroring connection request is received from a first external device, a second external device pairing-connected with the first external device is also mirrored. Accordingly, a mirroring screen for the first external device and a mirroring screen for the second external device can be displayed together.

19 Claims, 22 Drawing Sheets

(56) References Cited

U.S. PATENT DOCUMENTS

| | | | | |
|---|---|---|---|---|
| 5,872,575 A * | 2/1999 | Segal | G06T 15/00 | 345/473 |
| 6,065,042 A * | 5/2000 | Reimer | G06F 17/30817 | 348/E7.071 |
| 6,097,393 A * | 8/2000 | Prouty, IV | G06F 3/04815 | 345/419 |
| 6,409,602 B1 | 6/2002 | Wiltshire | A63F 3/081 | 463/16 |
| 6,658,662 B1 * | 12/2003 | Nielsen | H04N 7/16 | 348/E7.054 |
| 7,000,242 B1 * | 2/2006 | Haber | G06F 17/30274 | 715/719 |
| 7,054,831 B2 | 5/2006 | Koenig | G06Q 30/02 | 463/1 |
| 7,162,197 B2 * | 1/2007 | Kitamura | A63H 33/38 | 434/317 |
| 7,336,973 B2 * | 2/2008 | Goldthwaite | G06Q 20/10 | 455/550.1 |
| 7,715,642 B1 * | 5/2010 | Collins | G06T 13/00 | 345/629 |
| 8,043,156 B2 * | 10/2011 | Ackley | A63F 13/12 | 463/23 |
| 8,079,054 B1 * | 12/2011 | Dhawan | G06Q 30/00 | 705/14.4 |
| 8,221,220 B2 * | 7/2012 | Ackley | A63F 13/216 | 463/23 |
| 9,462,340 B1 * | 10/2016 | Mathurin | H04N 21/234336 | |
| 9,516,373 B1 * | 12/2016 | Abecassis | H04N 21/4307 | |
| 9,596,502 B1 * | 3/2017 | Abecassis | H04N 21/4307 | |
| 2001/0001160 A1 * | 5/2001 | Shoff | H04N 5/44543 | 725/51 |
| 2001/0037303 A1 * | 11/2001 | Mizrahi | G06Q 20/123 | 705/52 |
| 2001/0039571 A1 * | 11/2001 | Atkinson | G06Q 30/02 | 709/217 |
| 2002/0033844 A1 * | 3/2002 | Levy | G06F 21/10 | 715/744 |
| 2002/0052746 A1 * | 5/2002 | Handelman | H04N 7/163 | 704/270 |
| 2002/0069405 A1 * | 6/2002 | Chapin | H04N 7/162 | 725/32 |
| 2002/0133562 A1 * | 9/2002 | Newnam | G06Q 30/02 | 709/216 |
| 2002/0162117 A1 * | 10/2002 | Pearson | H04L 29/06027 | 725/106 |
| 2003/0056212 A1 * | 3/2003 | Siegel | H04N 5/913 | 725/31 |
| 2003/0149618 A1 * | 8/2003 | Sender | G06Q 30/02 | 705/14.55 |
| 2003/0149975 A1 * | 8/2003 | Eldering | H04N 7/17318 | 725/34 |
| 2003/0217210 A1 * | 11/2003 | Carau, Sr. | G06F 1/26 | 710/302 |
| 2004/0068536 A1 * | 4/2004 | Demers | G06F 17/30899 | 709/201 |
| 2004/0073493 A1 * | 4/2004 | Kato | G06Q 30/02 | 705/500 |
| 2004/0255322 A1 * | 12/2004 | Meadows | H04N 7/17309 | 725/23 |
| 2005/0066352 A1 * | 3/2005 | Herley | H04N 7/16 | 725/19 |
| 2005/0132398 A1 * | 6/2005 | Baran | G06Q 30/02 | 725/28 |
| 2005/0144024 A1 * | 6/2005 | Wojton | G06Q 10/10 | 705/319 |
| 2005/0267813 A1 * | 12/2005 | Monday | G06Q 30/02 | 705/26.1 |
| 2006/0123451 A1 * | 6/2006 | Preisman | H04N 7/17318 | 725/86 |
| 2006/0184579 A1 * | 8/2006 | Mills | H04N 7/173 | |
| 2006/0291483 A1 * | 12/2006 | Sela | H04L 12/66 | 370/401 |
| 2008/0015864 A1 * | 1/2008 | Ross | G10L 15/1822 | 704/275 |
| 2008/0089659 A1 * | 4/2008 | Clapper | G06F 17/30017 | 386/353 |
| 2008/0115161 A1 * | 5/2008 | Kurzion | G06Q 30/02 | 725/32 |
| 2008/0115655 A1 * | 5/2008 | Weng | G10H 1/0008 | 84/609 |
| 2008/0187279 A1 * | 8/2008 | Gilley | G06Q 30/02 | 386/250 |
| 2008/0221986 A1 * | 9/2008 | Soicher | G06Q 30/02 | 705/14.36 |
| 2008/0282283 A1 * | 11/2008 | Hilton | G06Q 20/12 | 725/5 |
| 2008/0285940 A1 * | 11/2008 | Kulas | G11B 27/3027 | 386/248 |
| 2008/0295129 A1 * | 11/2008 | Laut | H04N 21/812 | 725/34 |
| 2009/0094632 A1 * | 4/2009 | Newnam | H04N 7/17318 | 725/24 |
| 2009/0217316 A1 * | 8/2009 | Gupta | G06Q 30/0269 | 725/32 |
| 2009/0281908 A1 * | 11/2009 | Wong | G11B 27/034 | 705/26.1 |
| 2009/0293081 A1 * | 11/2009 | Pirani | H04N 7/17318 | 725/25 |
| 2009/0299752 A1 * | 12/2009 | Rodriguez | D06F 58/28 | 704/275 |
| 2010/0131385 A1 * | 5/2010 | Harrang | G06Q 30/00 | 705/26.1 |
| 2010/0256561 A1 * | 10/2010 | Gillespie, Jr. | A61M 5/142 | 604/151 |
| 2010/0283741 A1 * | 11/2010 | Heintze | G06F 3/0238 | 345/173 |
| 2010/0332570 A1 * | 12/2010 | Roberts | G06F 17/30029 | 707/912 |
| 2011/0137753 A1 * | 6/2011 | Moehrle | G06Q 30/02 | 705/27.1 |
| 2011/0138326 A1 * | 6/2011 | Roberts | G06Q 30/02 | 715/808 |
| 2011/0276334 A1 * | 11/2011 | Wang | G06F 17/30861 | 704/270 |
| 2011/0289536 A1 * | 11/2011 | Poder | H04H 60/97 | 725/95 |
| 2011/0310580 A1 * | 12/2011 | Leung | G06F 1/1618 | 361/807 |
| 2012/0016678 A1 * | 1/2012 | Gruber | G06F 17/3087 | 704/275 |
| 2012/0084811 A1 * | 4/2012 | Thompson | H04N 21/44222 | 725/34 |
| 2012/0084812 A1 * | 4/2012 | Thompson | H04N 21/25891 | 725/34 |
| 2012/0110620 A1 * | 5/2012 | Kilar | G06Q 30/02 | 725/34 |
| 2013/0304795 A1 * | 11/2013 | Kang | H04L 67/10 | 709/202 |
| 2014/0109161 A1 * | 4/2014 | Chang | H04M 1/72527 | 725/110 |
| 2014/0250477 A1 * | 9/2014 | Kang | H04N 21/4334 | 725/110 |
| 2014/0278834 A1 * | 9/2014 | Lautz | G06Q 30/0203 | 705/12 |
| 2016/0077573 A1 * | 3/2016 | Lee | H04L 12/12 | 713/310 |

OTHER PUBLICATIONS

Wi-Fi Alliance: "Wi-Fi Alliance Technical Committee Wi-Fi Display Technical Task Group Wi-Fi Display Technical Specification," Jan. 1, 2012, XP055320680, Retrieved from the Internet: URL: http:/_/www.wi-fi.org/discover-wi-fi/specifications [retrieved on Nov. 17, 2016] pp. 1-150.

Anonymous: "Displaying the Smartphone's Screen on the TV (Screen Mirroring)," Dec. 31, 2014, Retrieved from internet: URL:

(56) References Cited

OTHER PUBLICATIONS http:/_/docs.esupport.sony.com/imanual/Argentina/2014/SBR-55X855B/arisdb_uen/wfdisplay_wfintegrated.html [retrieved on Feb. 28, 2017] p. 1-p. 2.
Anonymous: "Reflector 2 Mac Features: Mirror, stream, record and more," Mar. 1, 2017, XP055350428, URL: http:/_/www.airsquirels.com/reflector/features/mac/ [retrieved on Feb. 1, 2017] p. 6.

* cited by examiner

FIG. 10
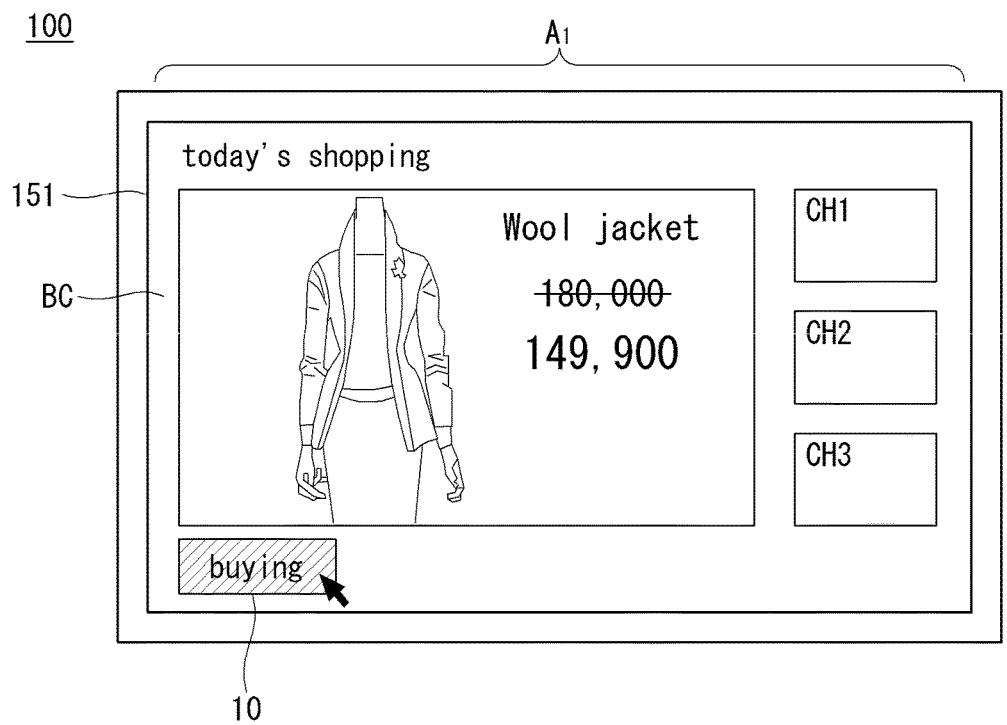
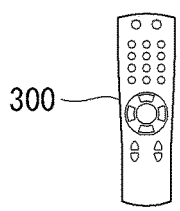

FIG. 12A
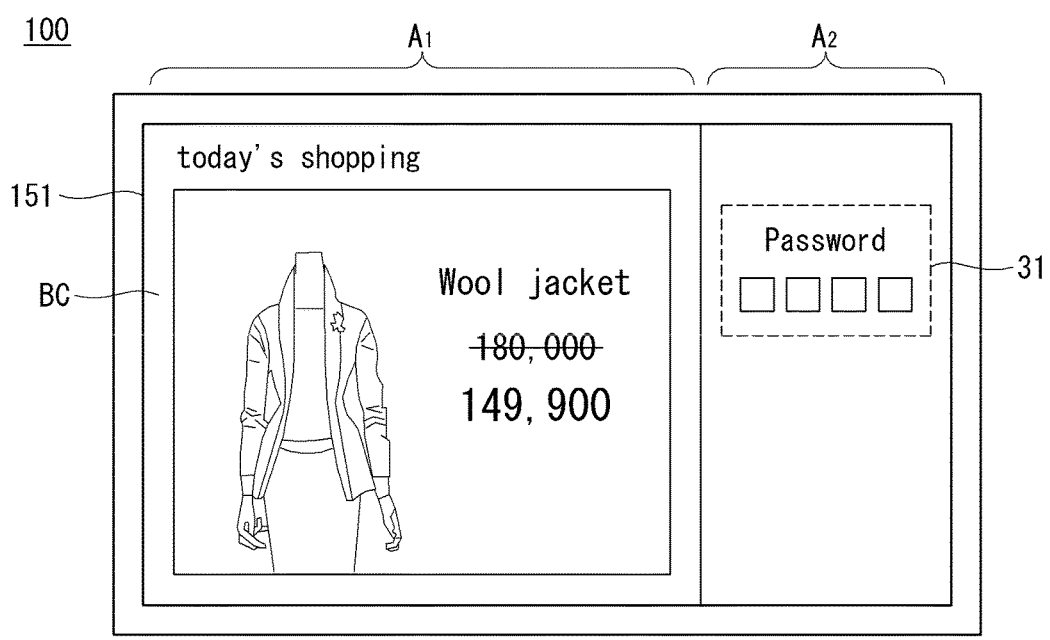
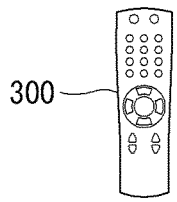

FIG. 12B
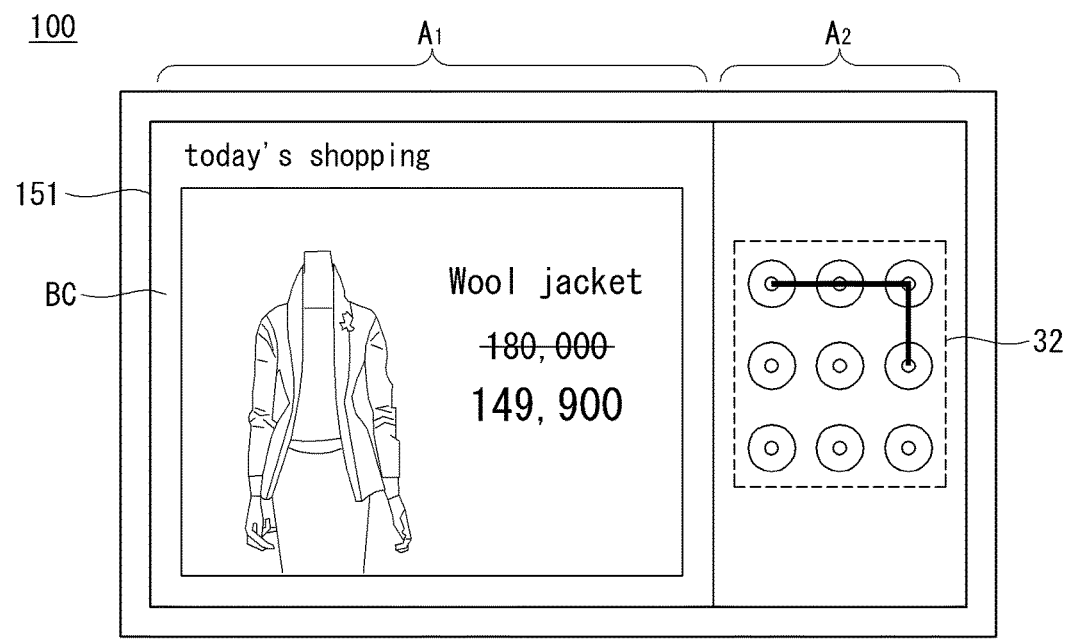
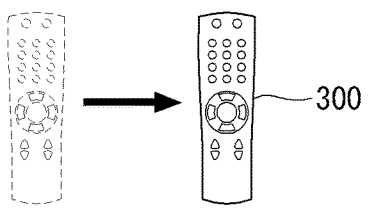

FIG. 12C
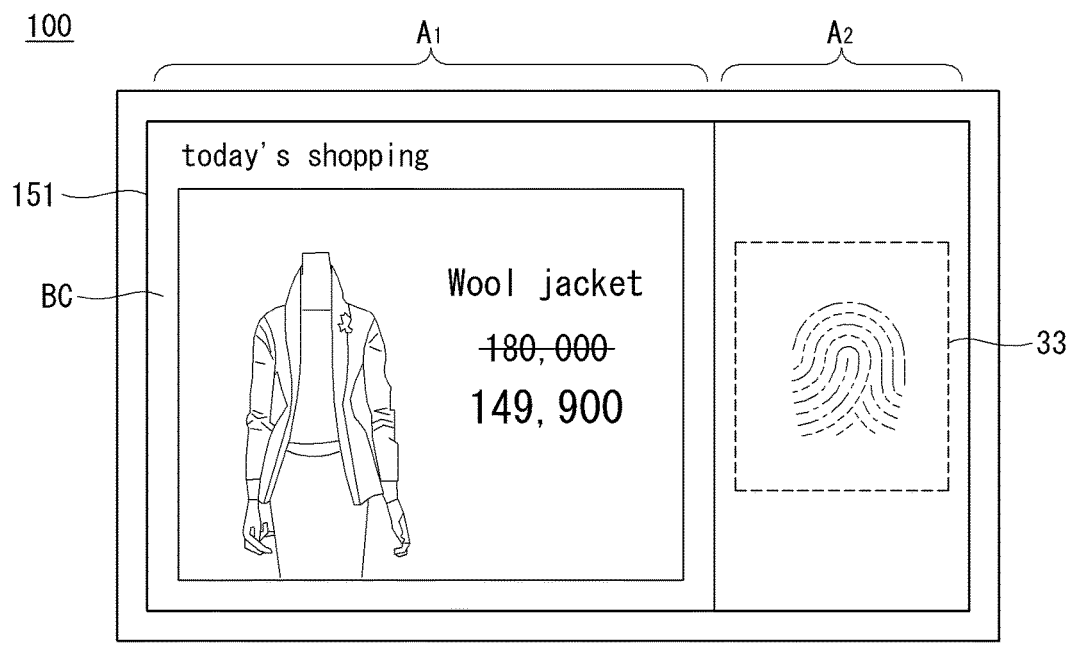
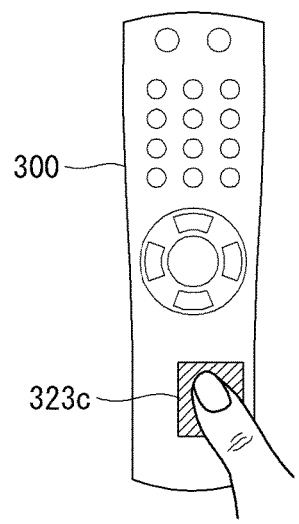

FIG. 13
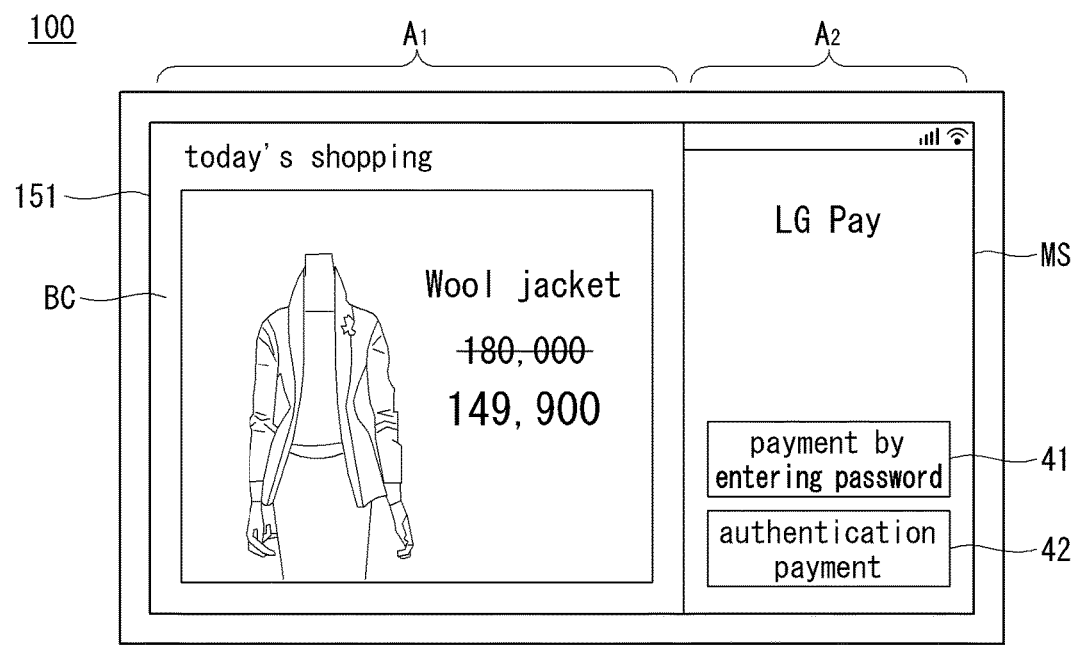
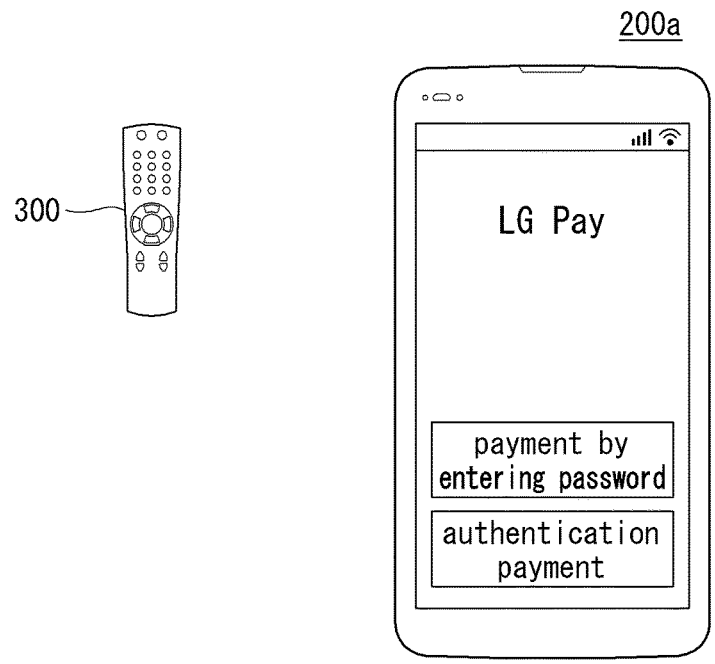

FIG. 14B
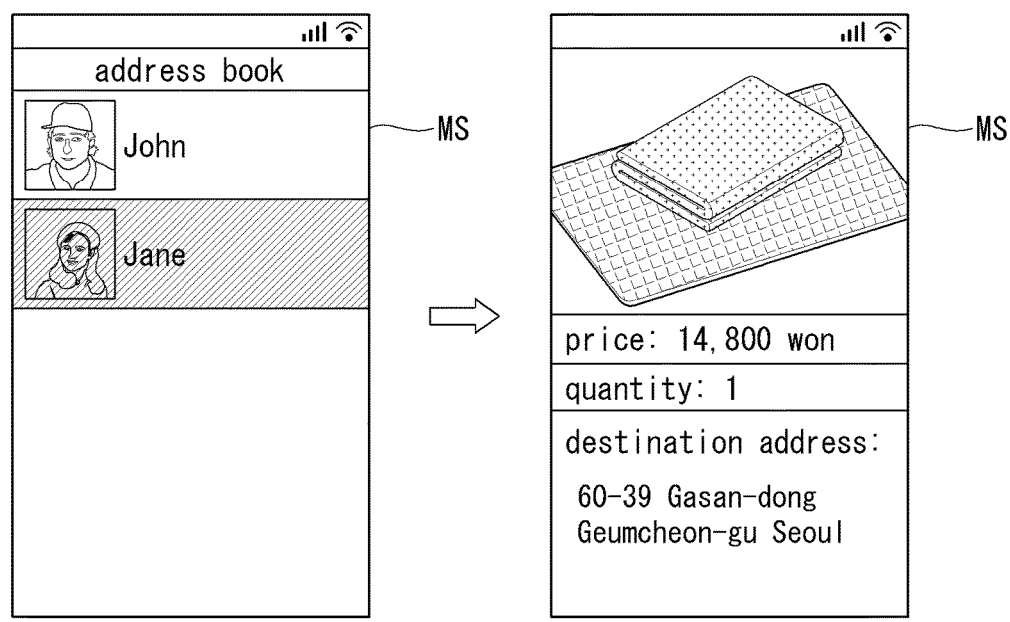
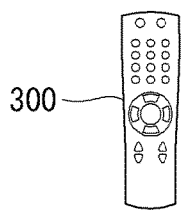

FIG. 15A
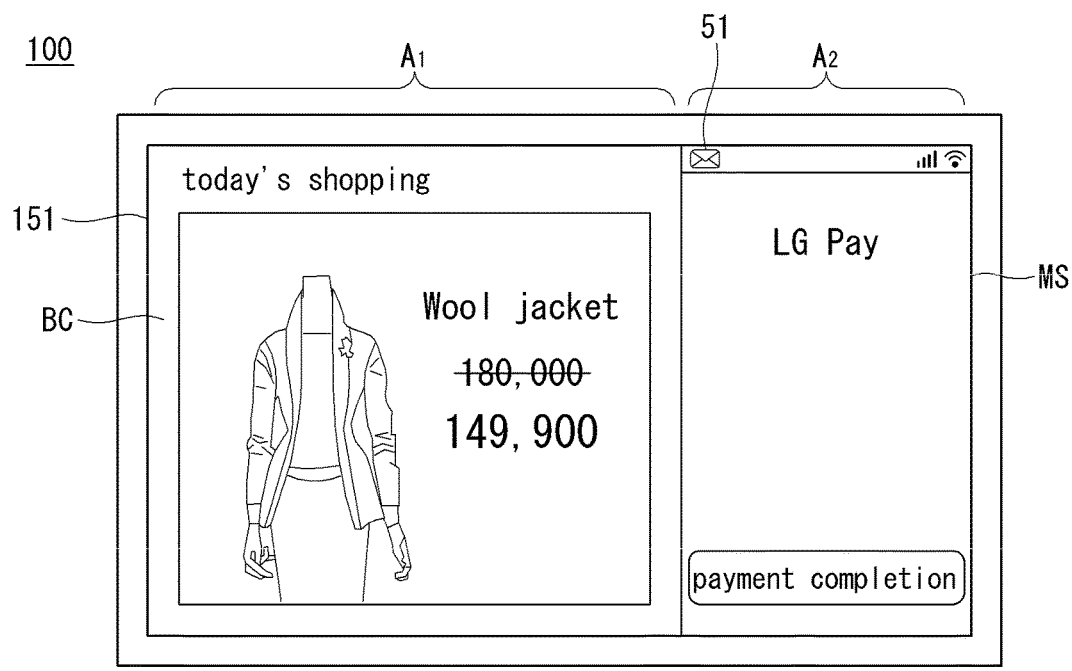
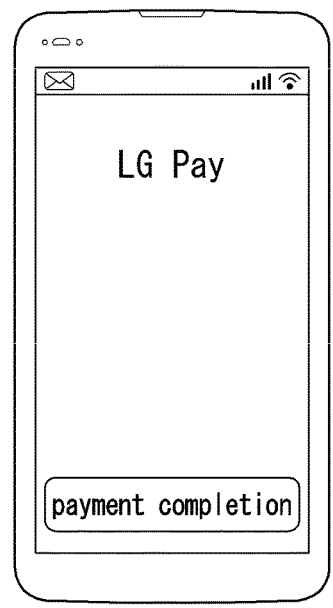

FIG. 17A
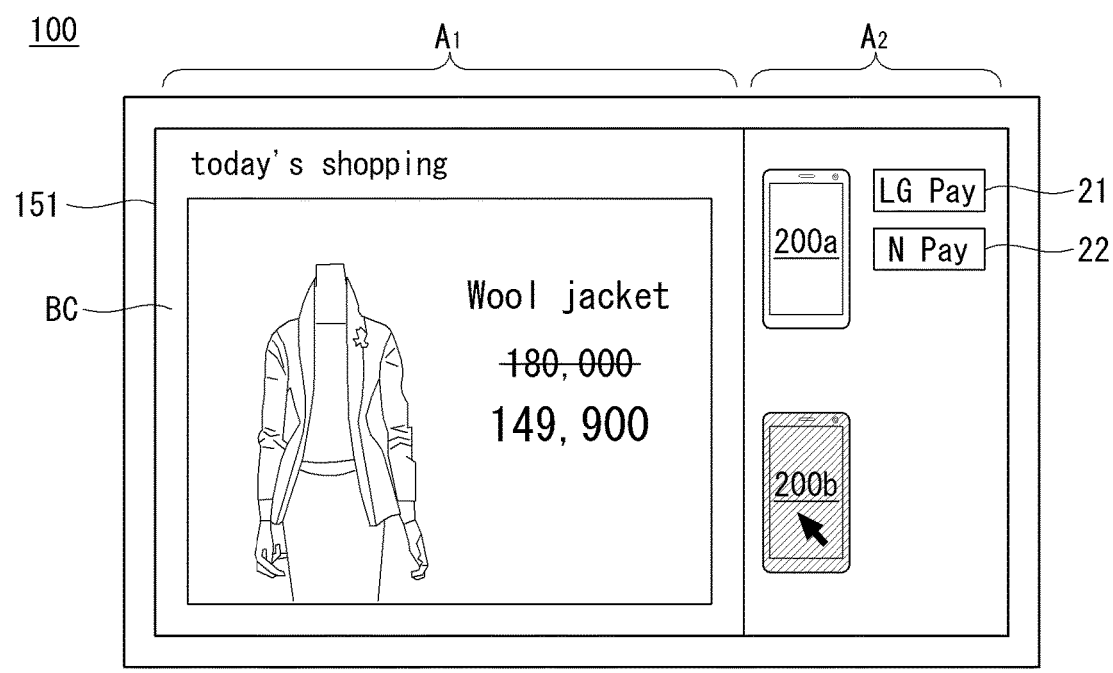
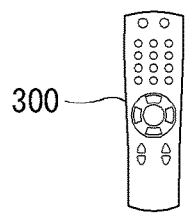

MOBILE TERMINAL AND METHOD FOR CONTROLLING THE SAME

CROSS-REFERENCE TO RELATED APPLICATION(S)

This application claims priority to Korean Patent Application No. 10-2015-0162864 filed on 19 Nov. 2015 in Korea, the entire contents of which is hereby incorporated by reference in its entirety.

BACKGROUND

1. Field

Embodiments of the invention relate to an electronic device and a method for controlling the electronic device, which can more easily perform payment functions through connection with external devices.

2. Background

The screen mirroring technology is a technique for directly transmitting the image displayed on one device (a source device) to another device (sink device) in the two device equipped with image display function. For example, it may refer to a technique of transmitting and displaying the image to be displayed on the source device such as a mobile phone or a tablet to the sink device such as a TV or a PC.

This screen mirroring technology is conventionally used to output applications (e.g., game and webpage images) executed in the terminal having a relatively small screen, such as a portable terminal on a larger screen, which can extend the usability of a portable terminal.

Therefore, recently, a portable mobile terminal with the screen mirroring technology such as "Wi-Fi Display" or "Mirroring Airplay" is increasing.

BRIEF DESCRIPTION OF THE DRAWINGS

The embodiments will be described in detail with reference to the following drawings in which like reference numerals refer to like elements wherein:

FIGS. 10 to 11 are diagrams for illustrating step S110 of FIG. 9.

FIGS. 12A to 12C are diagrams for illustrating an authentication process for mirroring connection with an external device.

FIG. 13 is a diagram for illustrating step S120 of FIG. 9.

FIGS. 14A to 14B are diagrams for illustrating step S130 of FIG. 9.

FIGS. 17A to 17B are diagrams for illustrating the operation of an electronic device according to another embodiment of the present invention.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As described above, the present invention should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (e.g., smart watches, smart glasses, head mounted displays (HMDs)), and the like.

By way of a non-limiting example only, further description will be made with reference to particular types of mobile terminals. However, such teachings apply equally to other types of terminals, such as those types noted above. In addition, these teachings may also be applied to stationary terminals, such as digital TV and desktop computers.

Figure 1:
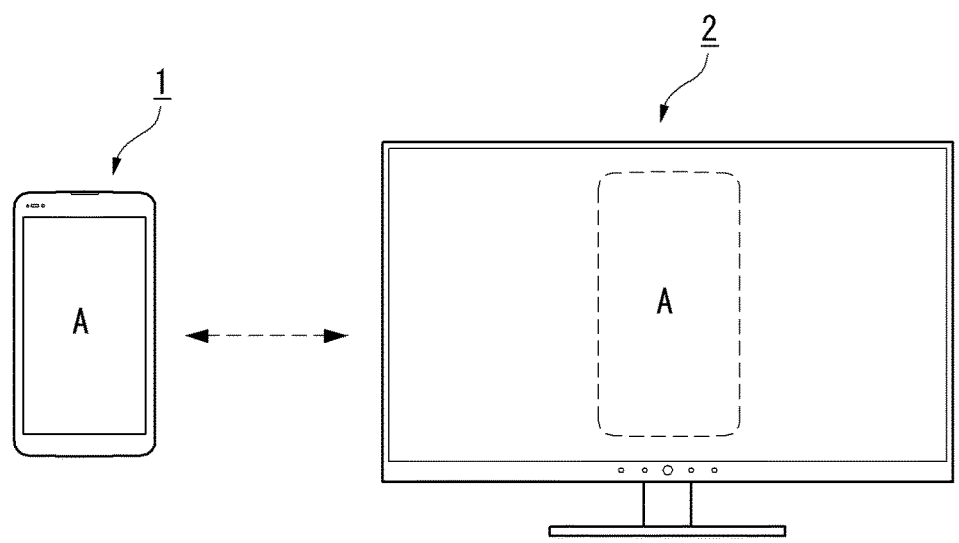
FIG. 1 is a diagram schematically illustrating an example in which an external device is connected to the electronic device by mirroring according to an embodiment of the present invention.

FIG. 1 is a diagram schematically illustrating an example in which an external device is connected to an electronic device by mirroring according to an embodiment of the present invention.

Referring to FIG. 1, a mobile terminal 1 may be connected to a display device 2 by mirroring. The mirroring connection technology is a wireless display transmission technology, and the mirroring technique disclosed in this document may display a screen, displayed on the mobile terminal 1, on a screen of the display device 2 at the same time as if the screen displayed on the mobile terminal 1 is reflected in the screen of the display device 2. Accordingly, the pixel information of the original screen of the mobile terminal 1 is sent wirelessly without any change.

The mirroring connection may be established using a wired method, such as D-sub (RGB), DVI (Digital Visual Interface), HDMI (High Definition Multimedia Interface), or DP (Display Port). The mirroring connection, however, may directly mirror a screen of the mobile terminal 1 into a display device 2 without the intervention of an access point through a Wi-Fi direct technology between the mobile terminal 1 and the display device 2. In addition, for example, the mirroring connection may be performed between the mobile terminal 1 and the display device 2 using a Wi-Fi Miracast method that is a wireless video transmission standard established by the Wi-Fi Association.

The mirroring connection disclosed in this document is different from a casting method of transmitting content without transmitting a screen of the mobile terminal 1 without any change. The casting method is a method for displaying an image on the display device 2 in such a manner that the mobile terminal 1 sends the image to a remote device (i.e., the display device 2) in the form of the video signal of content or sends the image to the remote device in a streaming manner, and may be representatively used to play the content by casting a URL address in a Wi-Fi direct manner. The mirroring connection disclosed in this document may mean to show a screen of a mobile terminal 1 in the display device 2 unlike the casting connection.

Figure 2:
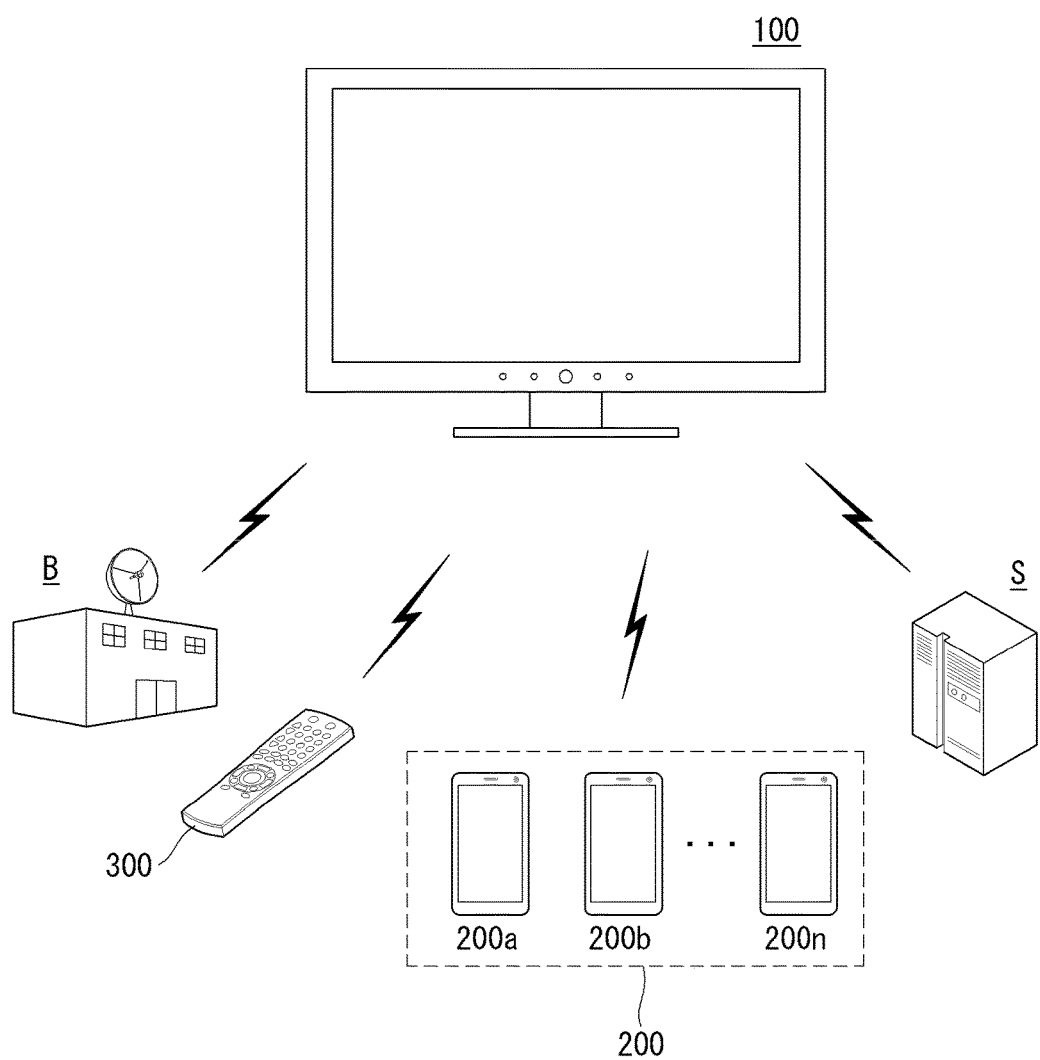
FIG. 2 is a diagram illustrating an environment in which a method for controlling an electronic device is implemented according to an embodiment of the present invention.

FIG. 2 is a diagram illustrating an environment in which a method for controlling an electronic device is implemented according to an embodiment of the present invention.

Referring to FIG. 2, the environment in which the method for controlling an electronic device is implemented according to an embodiment of the present invention may include an electronic device 100, a broadcasting station B, a server S, and mobile terminals 200, 300, and 400.

The electronic device 100 is a device capable of receiving broadcast content, and may refer to a fixed electronic device such as TV, a PC, and a digital signage device. The TV may include IPTV (Internet Protocol Television) and DTV (Digital Television).

The broadcasting station B sends a broadcast signal including broadcast content. The electronic device 100 may receive the broadcast from the broadcasting station B and receive broadcast via a predetermined server (not shown).

The electronic device 100 may communicate with the server S. The server S may include a network server, and is a device capable of transmitting and receiving signals to and from the electronic device 100 over an arbitrary network. For example, the server S may include a mobile terminal which may be connected to the electronic device 100 through a wired or wireless base station. In addition, the server S may include a device capable of providing content to the electronic device 100 over an internet network. A broadcast content provider may use the server S to provide content to the electronic device 100. In addition, the server S is a device capable of providing a variety of web services and other information to the electronic device 100 through the internet.

The mobile terminals 200, 300, and 400 are external devices capable of performing a mirroring connection with the electronic device 100. Each of the external devices may request a mirroring connection from the electronic device 100 in the state in which it has been connected with the electronic device 100. The electronic device 100 may perform the mirroring connection with the external devices in response to the mirroring connection request from the external devices.

According to an embodiment of the present invention, the first external device 200 of the external devices may be paired with a second external device 300 (e.g., a watch type mobile terminal) and/or a third external device 400 (e.g., a glass type mobile terminal). The pairing connection may be performed through a short-range communication method. A device connection according to the short-range communication method may be implemented using at least one of the Bluetooth (Bluetooth™) RFID (Radio Frequency Identification), infrared communication (Infrared Data Association; IrDA), UWB (Ultra Wideband), ZigBee, NFC (Near Field Communication), Wi-Fi (Wireless-Fidelity), Wi-Fi Direct, Wireless USB (Wireless Universal Serial Bus) technologies.

In the method for controlling the electronic device 100 according to an embodiment of the present invention, when the first external device 200 requests a mirroring connection from the electronic device 100 in the state in which at least two of the external devices 200, 300, and 400 have been paired, the second external device 300 and the third external device 400 paired with the first external device 200 are also connected to the electronic device 100 by mirroring.

Figure 3:
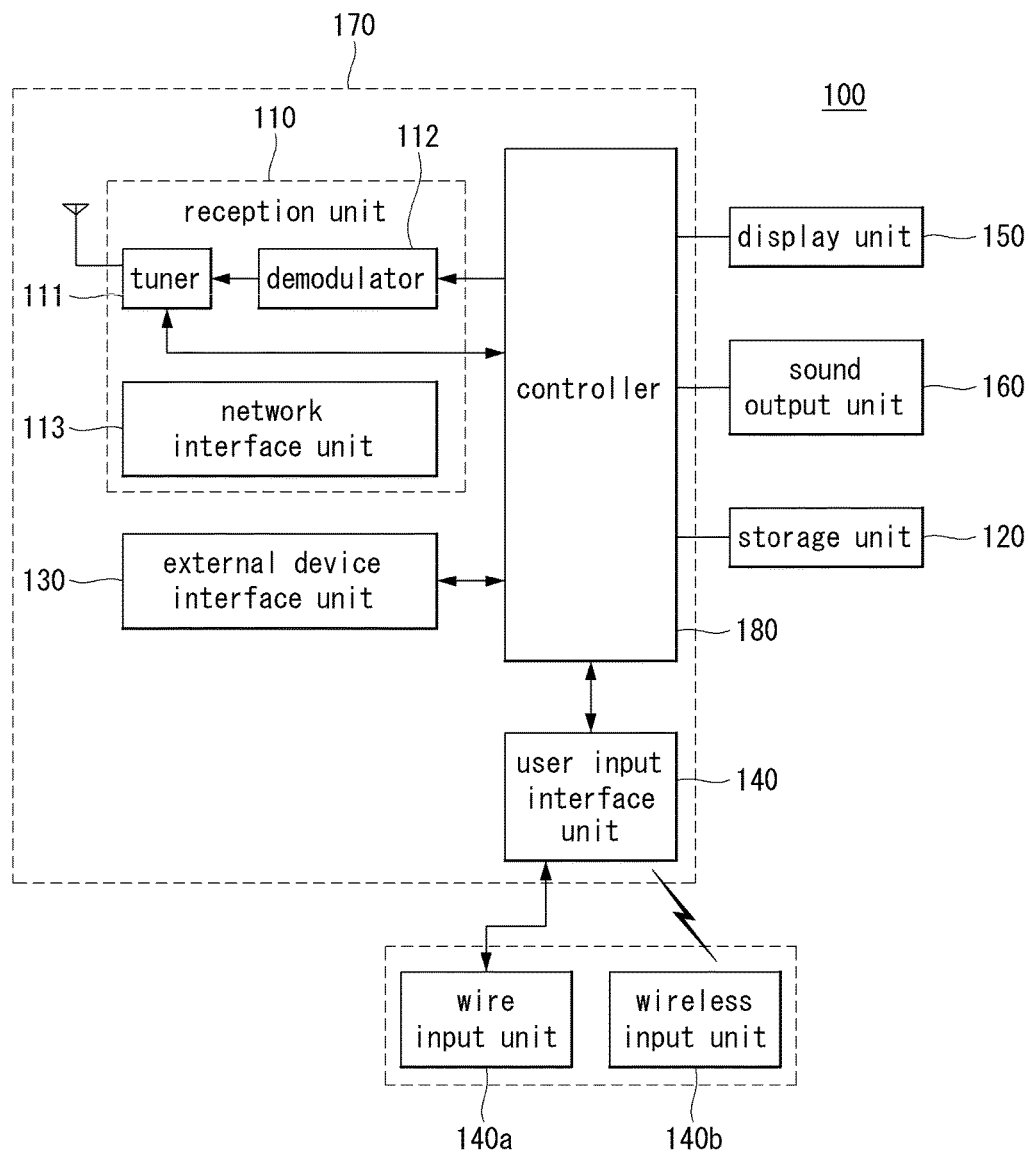
FIG. 3 is a block diagram of an electronic device according to an embodiment of the present invention.

FIG. 3 is a block diagram of the display device according to an embodiment of the present invention.

Referring to FIG. 3, the display device 100 according to an embodiment of the present invention includes a display unit 150 for displaying an image and a driving unit 170 for providing a driving signal to the display unit 150 in response to a received broadcast signal.

The display unit 150 may be called a display panel.

The driving unit 170 may control a video display and audio output of the display device 100. The driving unit 170 may include a reception unit 110, an external device interface unit 130, a storage unit 120, a user input interface unit 140, a controller 180, and a command input unit 150.

The driving unit 170 and the display unit 150 may be built in a single body. Furthermore, the driving unit 170 and the display unit 150 may be modularized separately, and may communicate with each other in a wired or wireless manner.

The display device 100 according to an embodiment of the present invention may further include a sound output unit 160 for outputting a sound.

The display device 100 according to an embodiment of the present invention may further include a sound output unit 172 for outputting a sound, a sound sensing unit 173 for sensing a sound, and a motion sensing unit 174 for sensing a user's motion.

The broadcast reception unit 110 includes a tuner 111, a demodulator 112, and a network interface unit 113. Depending on the needs, it is possible to design not to include the network interface unit 113 while incorporating the tuner 111 and the demodulator 112. On the contrary, it is equally possible to design not to include the tuner 111 and the demodulator 112 while incorporating the network interface unit 113.

The tuner 111 may select a Radio Frequency (RF) broadcast signal, corresponding to a channel selected by a user, from RF broadcast signals received through an antenna or may select RF broadcast signals corresponding to all of previously stored channels. Furthermore, the tuner 111 converts the selected RF broadcast signal into an intermediate frequency signal, a base band image, or an audio signal.

For example, if the selected RF broadcast signal is a digital broadcast signal, the tuner 111 may convert the RF broadcast signal into a digital IF signal (DIF). If the selected RF broadcast signal is an analog broadcast signal, the tuner 111 may convert the RF broadcast signal into an analog baseband video or an audio signal (CVBS/SIF). In other words, the tuner 111 may process both the digital broadcast signal and the analog broadcast signal. The analog baseband video or the audio signal (CVBS/SIF) output by the tuner 111 may be directly supplied to the controller 180.

The demodulator 112 may perform a demodulation operation by receiving a digital IF signal (DIF) converted by the tuner 111. For example, if the digital IF signal output by the tuner 111 complies with the ATSC scheme, the demodulator 112 may perform, for example, 8-VSB (8-Vestigal Side Band) demodulation. Furthermore, the demodulator 112 may perform channel demodulation. To this end, the demodulator 112 may be equipped with a Trellis decoder, de-interleaver, and Reed Solomon decoder for performing Trellis decoding, de-interleaving, and Reed Solomon decoding, respectively.

The controller 160 displays video on the display unit 150 after performing inverse-multiplexing and video/audio signal processing, and outputs an audio through the sound output unit 160.

The external device interface unit 130 may connect an external device to the display device 100 according to an embodiment of the present invention. To this end, the external device interface unit 130 may include an A/V input output unit (not shown) or a wireless communication unit (not shown). The external device interface unit 130 may be connected to an external device, such as a Digital Versatile Disk (DVD), a Blu-Ray device, a game device, a camcorder, or a computer, in a wired or wireless manner. The external device interface unit 135 may deliver video, audio, or a data signal inputted from the outside through a connected external device to the controller 160 of the display device 100.

The network interface unit 113 may provide an interface for connecting the display device 100 to a wired or wireless network including the Internet. The network interface unit 113 may be equipped with an Ethernet port for connection to a wired network. For connection to a wireless network, the network interface unit 113 may use a Wireless LAN (WLAN or Wi-Fi), Wireless broadband (Wibro), World Interoperability for Microwave Access (Wimax), or High Speed Downlink Packet Access (HSDPA) communication specifications.

The network interface unit 113 may transmit or receive data to and from another user or another electronic device over a network connected thereto or another network linked to the connected network.

The network interface unit 113 may access a predetermined webpage over a network connected thereto or another network linked to the connected network. In other words, the network interface unit 113 may transmit or receive data to and from a corresponding server by accessing the predetermined webpage over a network. Furthermore, the network interface unit 113 may receive content or data provided by a content provider or a network operator. In other words, the network interface unit 113 may receive content, such as a movie, an advertisement, game, VOD, and broadcast signals, and information related to content provided by a content provider or a network operator over the network. Furthermore, the network interface unit 113 may receive update information and an update file provided by a network operator. Moreover, the network interface unit 113 may transmit data to an Internet service provider, a content provider, or a network operator.

The storage unit 120 may store a program intended to process and control various signals within the controller 160 or to store processed video, audio, or data signals.

Furthermore, the storage unit 120 may function to temporarily store video, audio, or data signals received through the external device interface unit 130 or the network interface unit 113. Furthermore, the storage unit 120 may store information about a predetermined broadcast channel through a channel memory function.

The storage unit 120 may include at least one storage media, such as a flash memory type, a hard disk type, a multimedia card micro type, card type memory (e.g., SD or XD memory), RAM, and ROM (e.g., EEPROM).

The display device 100 may play back a content file (e.g., a video file, a still image file, a music file, a document file and/or an application file) stored in the storage unit 120 and provide the content to a user.

Although the storage unit 120 and controller 160 have been illustrated as being separately installed in FIG. 3, the storage unit 120 may be incorporated into the controller 180.

The user input interface unit 140 may be an interface with a remote controller for inputting a command to the electronic device 100. The user input interface unit 140 may receive various commands, such as power on/off, channel selection, screen configurations, volume control, a cursor movement on a screen, and menu selection.

When a user inputs a predetermined command through the wired input unit, the inputted command may be directly delivered to the controller 180 without the intervention of the user input interface unit 140. The user input interface unit 140 may receive and process a command from the wireless input unit using various communication methods, such as RF communication and infrared (IR) communication, or may process a control signal from the controller 180 so that the processed control signal is transmitted to the wireless input unit.

The user input interface unit 140 may receive and process a command from the wireless input unit 140b or may process a control signal from the controller 180 and transmit the processed control signal to the wireless input unit 140b using various communication methods, such as an RF (Radio Frequency) communication method and an infrared (IR) communication method. The wireless input device 300 described in this document may control the electronic device 100 wirelessly by transmitting a wireless control signal to the electronic device 100 through the wireless input unit 140b.

Furthermore, the controller 180 may control the display device 100 using a user command received through the user input interface unit 140 or an internal program. In particular, the controller 180 may connect to a network and download an application or a list of applications requested by a user onto the display device 100.

The controller 180 may control the play back of content. In this case, the content may refer to content stored in the display device 100, received broadcast content, or content received from the outside. The content may have at least one form of a broadcast video, an externally inputted video, an audio file, a still image, a connected web screen, and a document file.

Furthermore, the controller 160 searches for a user terminal connected to the display device through the network interface unit 113, displays a list of the retrieved user terminals on the display unit 171, and receives a signal for selecting a user terminal that belongs to the retrieved user terminals and that is used as a user controller through the user input interface unit 140.

In addition, the controller 180 controls the display unit 150 so that player information corresponding to each user terminal may be displayed on the display unit 150. The display unit 150 may convert a video signal, data signal, and OSD signal processed by the controller 180 or a video signal and data signal received from the external device interface unit 130 into R, G, and B signals, thereby generating a driving signal. The display unit 150 may be implemented in the form of a PDP, LCD, OLED, flexible display, or 3D display.

The display unit 150 may be formed of a touch screen in such a way as to be used as an input device as well as an output device.

The sound output unit 160 receives a signal processed by the controller 180, for example, a stereo signal, a 3.1 channel signal or a 5.1 channel signal and outputs the received signal in a sound form. The sound output unit 160 may be implemented in various forms of speakers.

Figure 4:
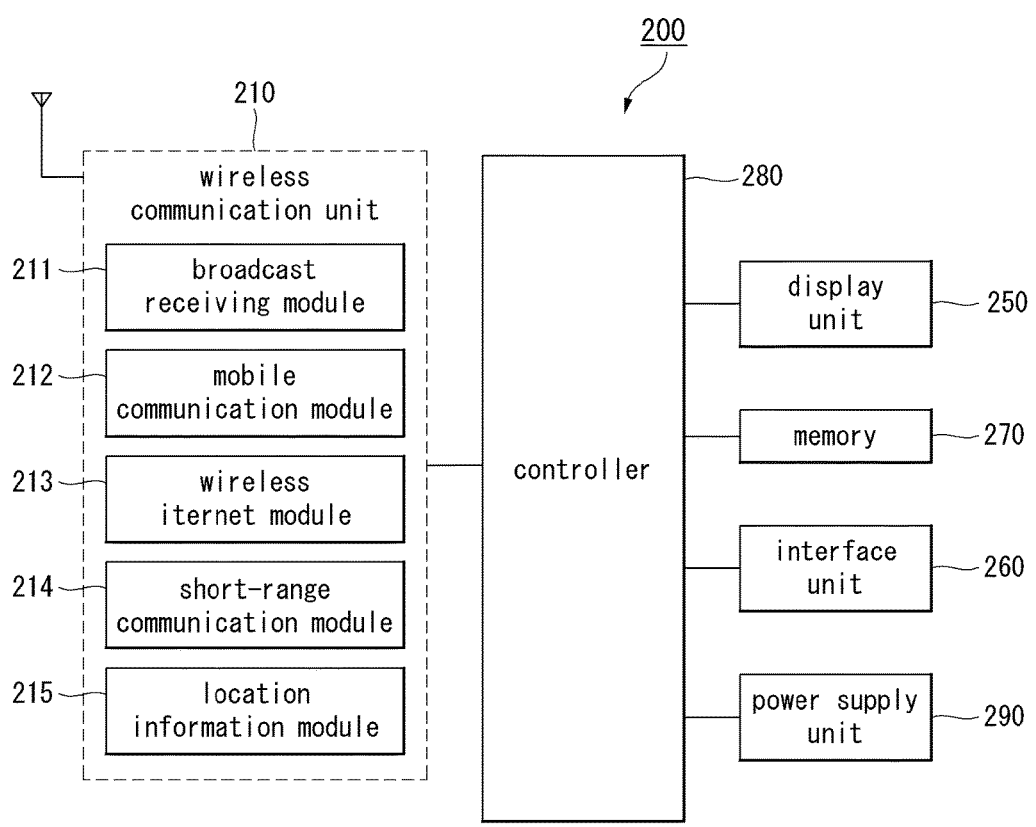
FIG. 4 is a block diagram of a mobile terminal which may operate in conjunction with an electronic device according to an embodiment of the present invention.

FIG. 4 is a block diagram of a mobile terminal which may operate in conjunction with the electronic device according to an embodiment of the present invention.

In other words, in this document, it is assumed that a first external device that has requested a mirroring connection with the electronic device 100 is the mobile terminal.

The mobile terminal 200 has been illustrated as having elements, such as a wireless communication unit 210, an output unit 250, an interface unit 260, a controller 280, and a power supply unit 290. It is understood that implementing all the illustrated elements is not a requirement and that elements greater or fewer than the elements may be optionally implemented.

The wireless communication unit 210 typically includes one or more modules which permit communications, such as wireless communications between the mobile terminal 200 and a wireless communication system, communications between the mobile terminal 200 and another mobile terminal (e.g., 300), communications between the mobile terminal 200 and an external server. Further, the wireless communication unit 210 typically includes one or more modules which connect the mobile terminal 200 to one or more networks.

In order to facilitate such communications, the wireless communication unit 210 includes one or more of a broadcast receiving module 211, a mobile communication module 212, a wireless Internet module 213, a short-range communication module 214, and a location information module 215.

Referring back to FIG. 4, various elements illustrated in FIG. 4 are described in more detail below. In the wireless communication unit 210, the broadcast receiving module 211 is typically configured to receive a broadcast signal and/or broadcast-associated information from an external broadcast management entity through a broadcast channel. The broadcast channel may include a satellite channel or a terrestrial channel or both. In some embodiments, two or more broadcast receiving modules 211 may be used to facilitate the simultaneous reception of two or more broadcast channels or to support switching between broadcast channels.

The mobile communication module 212 may transmit and/or receive wireless signals to/from one or more network entities. Typical examples of the network entity include a base station, an external mobile terminal, a server, and the like. Such network entities form part of a mobile communication network, which is constructed according to technical standards or communication methods for mobile communications (e.g., Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), and LTE-A (Long Term Evolution-Advanced)). Examples of wireless signals transmitted and/or received through the mobile communication module 212 include audio call signals, video (telephony) call signals, or various formats of data to support communication for text and multimedia messages.

The wireless Internet module 213 is configured to facilitate wireless Internet access. This module may be internally or externally coupled to the mobile terminal 200. The wireless Internet module 213 may transmit and/or receive wireless signals over communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), and LTE-A (Long Term Evolution-Advanced). The wireless Internet module 113 may transmit/receive data using one or more of the wireless Internet technologies and other Internet technologies as well.

In some embodiments, if the wireless Internet access is implemented according to WiBro, HSDPA, HSUPA, GSM, CDMA, WCDMA, LTE, or LTE-A, for example, as part of a mobile communication network, the wireless Internet module 213 performs such wireless Internet access. As described above, the Internet module 213 may cooperate with or function as the mobile communication module 212.

The short-range communication module 214 is configured to facilitate short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), etc. In general, the short-range communication module 214 supports wireless communications between the mobile terminal 200 and a wireless communication system, communications between the mobile terminal 200 and another mobile terminal 200, or communications between the mobile terminal and a network where another mobile terminal 200 (or an external server) is located over wireless area networks. One example of the wireless area networks is a wireless personal area network.

In some embodiments, another mobile terminal (which may be configured similarly to the mobile terminal 200) may be a wearable device, for example, a smart watch, a smart glass or a head mounted display (HMD), which may exchange data with the mobile terminal 200 (or may cooperate with the mobile terminal 200). The short-range communication module 214 may sense or recognize the wearable device, and permit communication between the wearable device and the mobile terminal 200. In addition, if a sensed wearable device is a device which has been authenticated to communicate with the mobile terminal 200, the controller 280, for example, may allow data processed by the mobile terminal 200 to be transmitted to the wearable device through the short-range communication module 214. In this case, the user of the wearable device may use the data processed by the mobile terminal 200 on the wearable device. For example, when a call is received by the mobile terminal 200, a user may answer the call using the wearable device. Furthermore, when a message is received by the mobile terminal 200, a user may check the received message using the wearable device.

In general, the location information module 215 is configured to detect, calculate, derive or identify the position of the mobile terminal. For example, the location information module 215 includes a Global Position System (GPS) module or a Wi-Fi module or both. If desired, the location information module 215 may alternatively or additionally function with any of the other modules of the wireless communication unit 210 in order to obtain data related to the position of the mobile terminal.

For example, if the mobile terminal uses the GPS module, the position of the mobile terminal may be obtained using signals sent by GPS satellites. For another example, if the mobile terminal uses the Wi-Fi module, the position of the mobile terminal may be obtained based on information related to a wireless access point (AP) which transmits or receives a wireless signal to or from the Wi-Fi module.

Further, the sensing unit is typically implemented using one or more sensors configured to sense internal information about the mobile terminal 200, the surrounding environment of the mobile terminal 200, user information, and the like. If desired, the sensing unit may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., a camera), a microphone, a battery gauge, an environment sensor (e.g., a barometer, a hygrometer, a thermometer, a radiation detection sensor, a thermal sensor, and a gas sensor), and a chemical sensor (e.g., an electronic nose, a health care sensor, and a biometric sensor), to name a few. The mobile terminal 200 may be configured to use information obtained from sensing unit, and in particular, information obtained from one or more sensors of the sensing unit, and combinations thereof.

In general, the display unit 250 is configured to output information processed by the mobile terminal 200. For example, the display unit 250 may display execution screen information about an application program that is executed in the mobile terminal 200 or user interface (UI) and graphic user interface (GUI) information in response to the execution screen information.

The interface unit 260 serves as an interface with various types of external devices that may be coupled to the mobile terminal 200. The interface unit 260, for example, may include any of wired or wireless ports, external power supply ports, wired or wireless data ports, memory card ports, ports for connecting a device having an identification module, audio input/output (I/O) ports, video I/O ports, and earphone ports. In some cases, the mobile terminal 200 may perform assorted control functions associated with a connected external device in response to the connection of the external device with the interface unit 260.

The memory 270 is typically implemented to store data that support various functions or features of the mobile terminal 200. For example, the memory 270 may be configured to store application programs executed in the mobile terminal 200 and data or instructions for the operations of the mobile terminal 200. Some of these application programs may be downloaded from an external server through wireless communication. Other application programs may be installed on the mobile terminal 200 upon manufacturing or shipping, which is typically the case for the basic functions (e.g., receiving a call, making a call, receiving a message, and sending a message) of the mobile terminal 200. In general, the application programs are stored in the memory 270, installed on the mobile terminal 200, and executed by the controller 280 in order to perform an operation (or function) for the mobile terminal 200.

The controller 280 typically functions to control an overall operation of the mobile terminal 200 in addition to operations associated with the application programs. The controller 280 may provide or process information or functions appropriate for a user by processing signals, data and/or information, which are inputted or output by the various elements illustrated in FIG. 4 or by activating the application programs stored in the memory 270. For example, the controller 280 controls some or all of the elements illustrated in FIG. 4 in response to the execution of an application program that has been stored in the memory 270.

The power supply unit 290 may be configured to receive external power or to provide internal power in order to supply appropriate power for driving elements and the elements included in the mobile terminal 200. The power supply unit 290 may include a battery. The battery may be configured to be embedded in the terminal body or configured to be detachable from the terminal body.

The interface unit 260 serves as an interface for external devices to be connected with the mobile terminal 200. For example, the interface unit 260 may receive data transmitted by an external device, may receive power to be transferred to elements and the elements within the mobile terminal 200, or may transmit the internal data of the mobile terminal 200 to the external devices. The interface unit 260 may include wired or wireless headset ports, external power supply ports, wired or wireless data ports, memory card ports, ports for connecting a device having an identification module, audio input/output (I/O) ports, video I/O ports, and earphone ports.

The power supply unit 290 receives external power or provides internal power and supplies appropriate power for driving elements and the elements included in the mobile terminal 200. The power supply unit 290 may include a battery, which is typically rechargeable or detachably coupled to the terminal body for charging.

The power supply unit 290 may include a connection port. The connection port may be configured as one example of the interface unit 260 to which an external charger for supplying power for recharging the battery is electrically connected.

For another example, the power supply unit 290 may be configured to recharge the battery in a wireless manner without using a connection port. In this example, the power supply unit 290 may receive power, transferred by an external wireless power transmitter, using at least one of an inductive coupling method based on magnetic induction and a magnetic resonance coupling method based on electromagnetic resonance.

Various embodiments described herein may be implemented in a computer-readable medium, a machine-readable medium or a similar medium using software or hardware or any combination thereof, for example.

Figure 5:
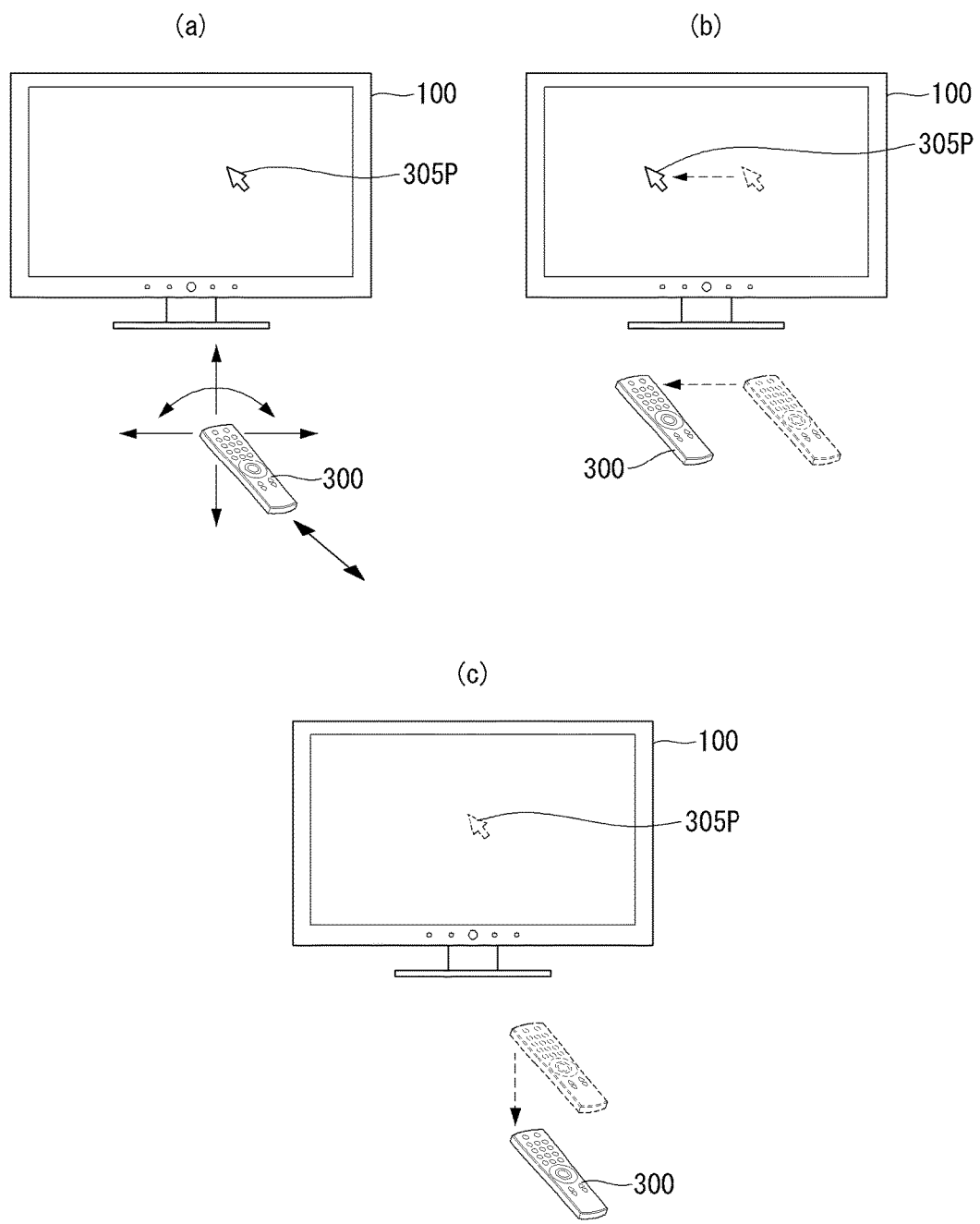
FIG. 5 is a diagram illustrating a method of controlling an electronic device through a wireless input according to an embodiment of the present invention.

FIG. 5 is a view illustrating a method of controlling the electronic device through the wireless input unit according to an embodiment of the present invention.

FIG. 5(*a*) illustrates that a pointer 305P corresponding to the wireless input device 300 is displayed on the display unit 150. In this case, the pointer 305P may be a cursor.

A user may move or rotate the wireless input device 300 up and down and right and left (FIG. 5(*b*)) and back and forth (FIG. 5 (*c*)). In this case, the pointer 305P displayed on the display unit 150 of the electronic device 100 may correspond to a motion of the wireless input device 300. Since the corresponding pointer 305P is moved and displayed according to a movement in the 3D space, the wireless input device 300 may be named a space remote controller.

FIG. 5(*b*) illustrates that when a user moves the wireless input device 300 to the left, the pointer 305P displayed on the display unit 150 of the electronic device 100 also moves to the left. Information about the motion of the wireless input device 300 detected by the sensor of the wireless input device 300 is transmitted to the controller 180 of the electronic device 100. The controller 180 may calculate the coordinates of the pointer 305P from the information about the motion of the wireless input device 300. In addition, the display unit 150 of the electronic device 100 may display the pointer 305P so that it corresponds to the calculated coordinates.

FIG. 5(*c*) illustrates a case where a user moves the wireless input device 300 away from the display unit 150 while pressing a specific button of the wireless input device 300. In this case, a selection region in the display unit 150 corresponding to the pointer 305P may be zoomed in, enlarged, and displayed. In contrast, when a user moves the wireless input device 300 to become close to the display unit 150, a selection region in the display unit 150 corresponding to the pointer 305P may be zoomed out, reduced, and displayed. When the wireless input device 300 moves away from the display unit 150, the selection region may be zoomed out. When the wireless input device 300 approaches the display unit 150, a selection region may be zoomed in. In the state in which a specific button in the wireless input device 300 has been pressed, the recognition of an upper and lower or left and right movement may be excluded. That is, when the wireless input device 300 moves closer to or away from the display unit 150, an up and down or left and right movement is not recognized, but only a back and forth movement may be recognized. In the state in which a specific button of the wireless input device 300 has not been pressed, only the pointer 305P moves in response to an up and down or left or right movement of the wireless input unit 300.

The moving speed or moving direction of the pointer 305P may correspond to the moving speed or moving direction of the wireless input device 300.

The pointer 305P may refer to an object that is displayed on the display unit 150 in response to the operation of the wireless input device 300. Therefore, the pointer 305P may have various forms of objects in addition to the arrow shape shown in the drawing. For example, the point may be a concept including a point, a cursor, prompt, a thick outline and so on. Furthermore, the pointer 305P may be displayed in accordance with any one point in the horizontal axis and the vertical axis of the display unit 150 and may also be displayed in accordance with multiple points, such as lines and surfaces.

Figure 6:
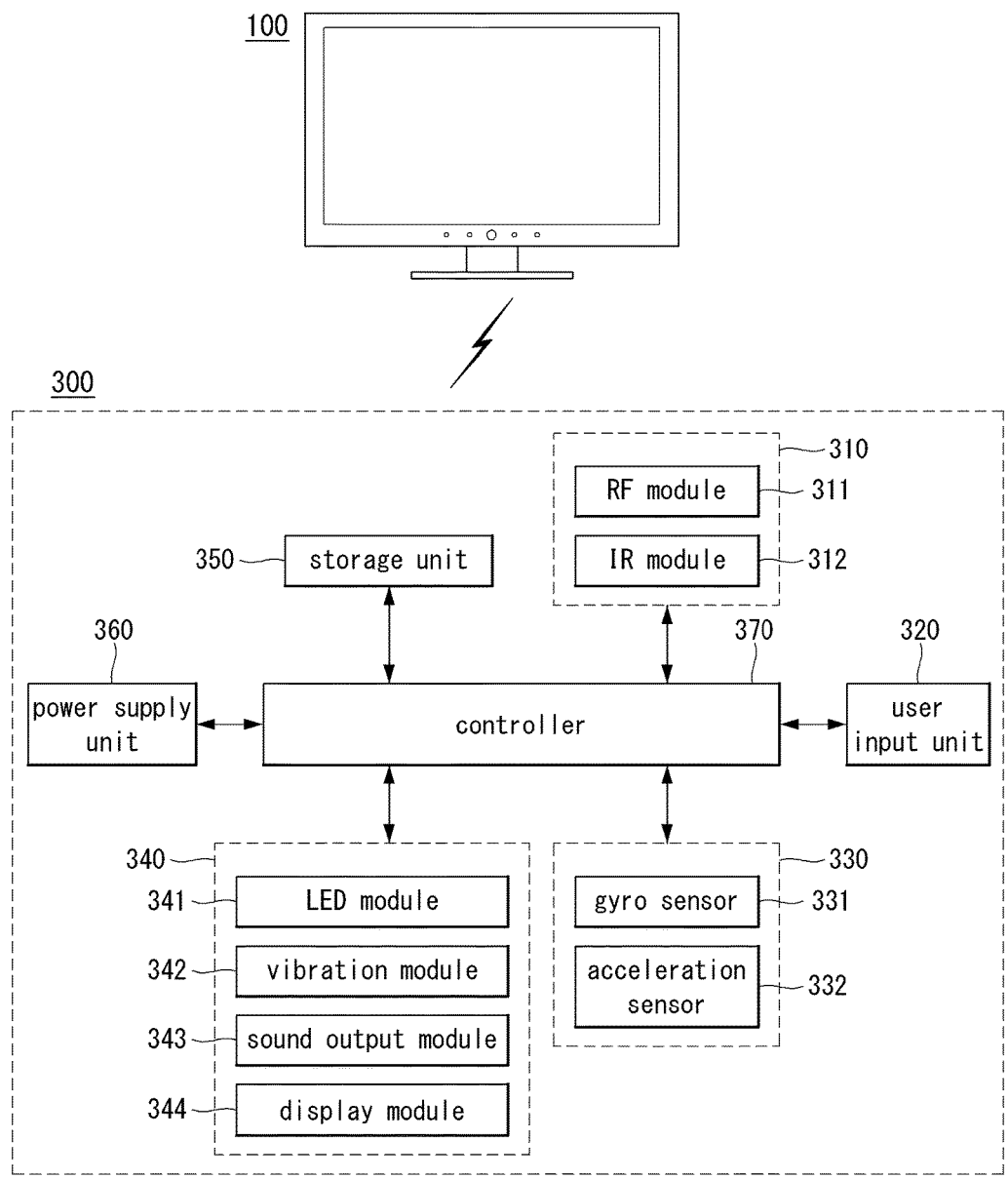
FIG. 6 is a block diagram of a wireless input device for controlling an electronic device according to an embodiment of the present invention.
Figure 7:
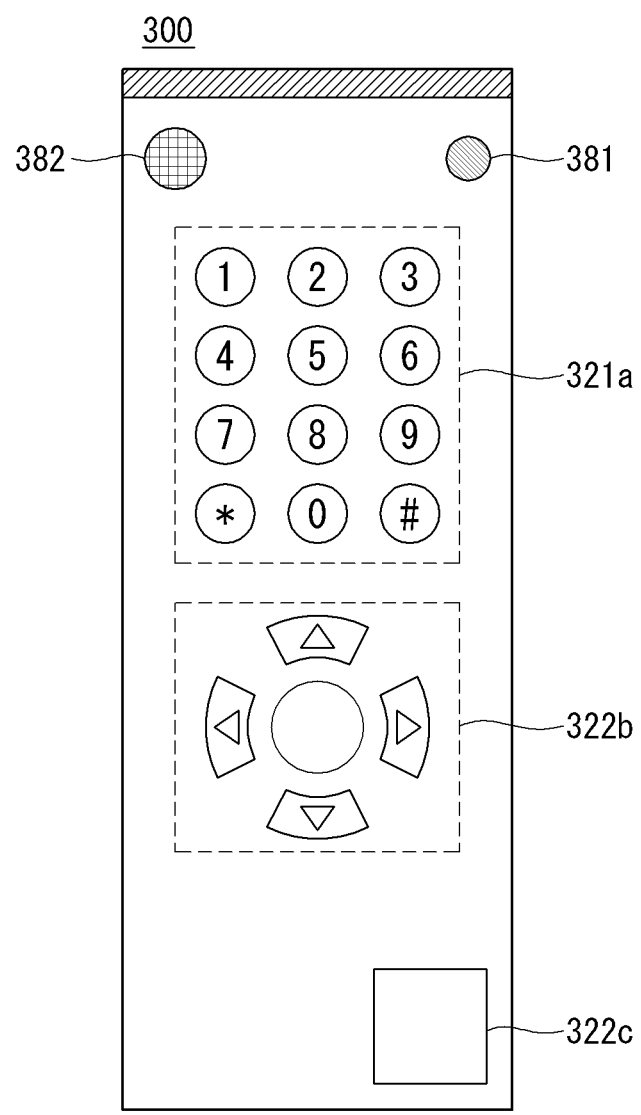
FIG. 7 is a schematic diagram for illustrating the appearance of the wireless input device of FIG. 6.

FIG. 6 is a block diagram of the wireless input device for controlling the electronic device according to an embodiment of the present invention. FIG. 7 is a schematic view for illustrating the appearance of the wireless input device of FIG. 6.

Referring to FIG. 6, the wireless input device 300 may include a wireless communication unit 310, a user input unit 320, a sensor unit 330, an output unit 340, a power supply unit 360, a storage unit 350, and a control unit 370.

The wireless communication unit 310 may communicate with the controller 180 of the electronic device 100 according to embodiments of the present invention described in above.

For example, the wireless input device 300 may include an RF module 311 capable of transmitting and receiving signals to and from the controller 180 through the user input interface unit 140 of the electronic device 100 in accordance with the RF communication standard. In addition, the wireless input device 300 may include an IR module 312 capable of transmitting and receiving signals according to the IR communication standard.

In this case, the wireless input device 300 may transmit a signal, including information about a movement of the wireless input device 300, to the controller 180 of the electronic device 100 through the RF module 311.

In addition, the wireless input device 300 may receive a signal transmitted by the controller 180 of the electronic device 100 through the RF module 311. In addition, the wireless input device 300 may transmit a command regarding on/off, a change of a channel, a change of volume to the controller 180 of the electronic device 100 through the IR module 312, if necessary.

The user input unit 320 may include a keypad, buttons, a touch pad, or touch screen. A user may enter a command related to the electronic device 100 to the wireless input device 300 by manipulating the user input unit 320.

For example, as shown in FIG. 7, the wireless input device 300 may include a touchpad 322*c*. The wireless input device 300 may control a movement of the pointer 305P shown in FIG. 5 through a touch gesture on the touch pad 322*c*. According to an embodiment of the present invention, the touch pad 322*c* may be used for a user authentication function by including a fingerprint recognition sensor capable of sensing a user's fingerprint.

If the user input unit 320 includes hard key buttons, a user may input a command related to the electronic device 100 to the wireless input device 300 through an operation of pushing a hard key button. For example, referring to FIG. 7, the user input unit 320 may further include at least one of numeric input keys 321*a*, direction control keys 322*b* (e.g., a channel up key, a channel down key, a volume up key, a volume down key), and a power key 381.

When the user input unit 320 includes a touch screen, a user may input a command related to the electronic device 100 to the wireless input device 300 by touching a soft key on the touch screen. In addition, the user input unit 320 may include a variety of input means capable of being manipulated by a user, such as a scroll key or a jog key. The present embodiment does not limit the scope of the present invention.

The sensor unit 330 may include a gyro sensor 331 or an acceleration sensor 332. The gyro sensor 331 may sense information about a motion of the wireless input device 300. For example, the gyro sensor 331 may sense information about an operation of the wireless input device 300 based on the x, y, and z axes. The acceleration sensor 332 may sense information about the moving speed of the wireless input device 300. The sensor unit 330 may further include a distance measuring sensor. The distance measuring sensor may sense the distance from the display unit 150.

The output unit 340 may output a video or audio signal corresponding to a manipulation of the user input unit 320 or corresponding to a signal sent by the control section 180 of the electronic device 100. A user may recognize whether or not the user input unit 320 is manipulated or the electronic device 100 is controlled through the output unit 340. For example, the output unit 340 may include an LED module 341 that is turned on, a vibration module 342 that generates vibration, a sound output module 343 that outputs a sound, and a display module 344 that outputs video when the user input unit 320 is manipulated or the wireless input device 300 transmits and receives signals to and from the electronic device 100 through the wireless communication unit 310.

The power supply unit 360 supplies power to the wireless input device 300. The power supply unit 360 can reduce the waste of power by stopping the supply of power when the wireless input device 300 does not move for a predetermined time. The power supply unit 360 may resume the supply of power when a predetermined key provided in the wireless input device 300 is manipulated.

The storage unit 350 may store various types of programs, applications, and data for control or operations of the wireless input device 300. If the wireless input device 300 transmits and receives signals wirelessly to and from the electronic device 100 through the RF module 311, the wireless input device 300 and the electronic device 100 may transmit and receive the signals in a given frequency band. The controller 370 of the wireless input device 300 may store information about a frequency band in which signals may be transmitted and received wirelessly to and from the electronic device 100 paired with the wireless input device 300 in the storage unit 350, and may refer to the stored information.

The controller 370 may control all of matters related to control of the wireless input device 300. The controller 370 may transmit a signal corresponding to a predetermined key manipulation of the user input unit 320 or a signal corresponding to a motion of the wireless input device 300 sensed by the sensor 330 to the electronic device 100 through the wireless communication unit 310.

Figure 8:
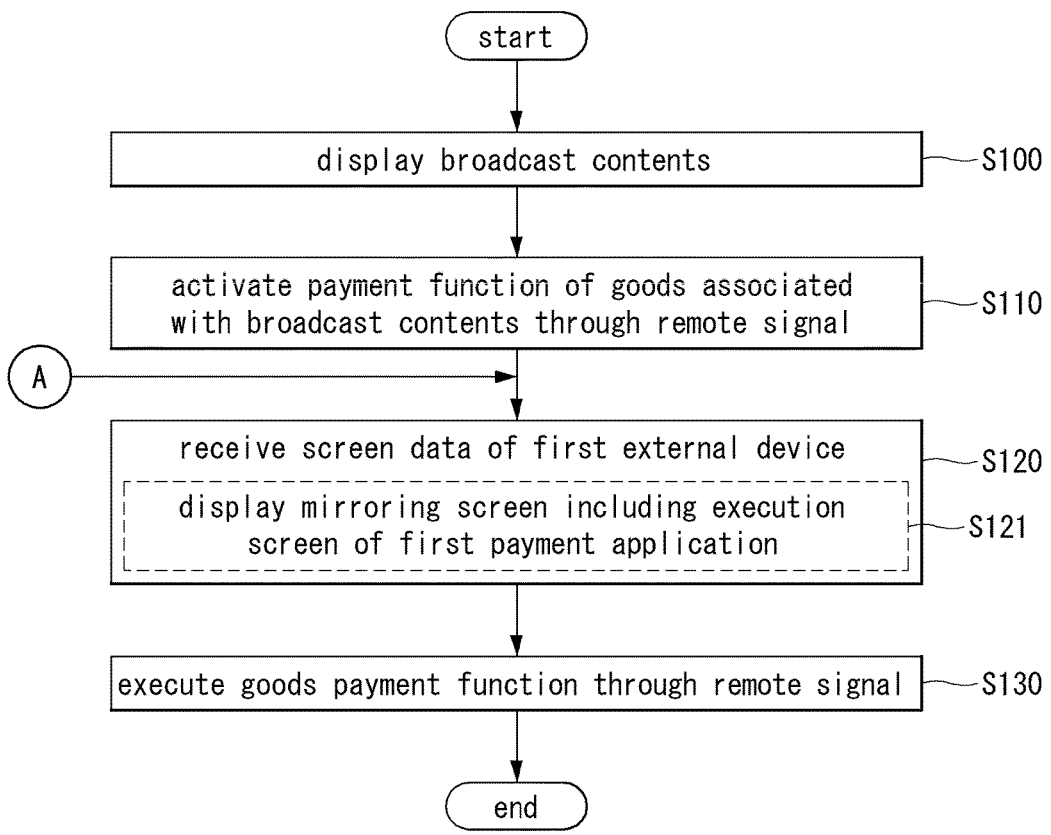
FIG. 8 is a flowchart of a method for controlling an electronic device according to an embodiment of the present invention.
Figure 9:
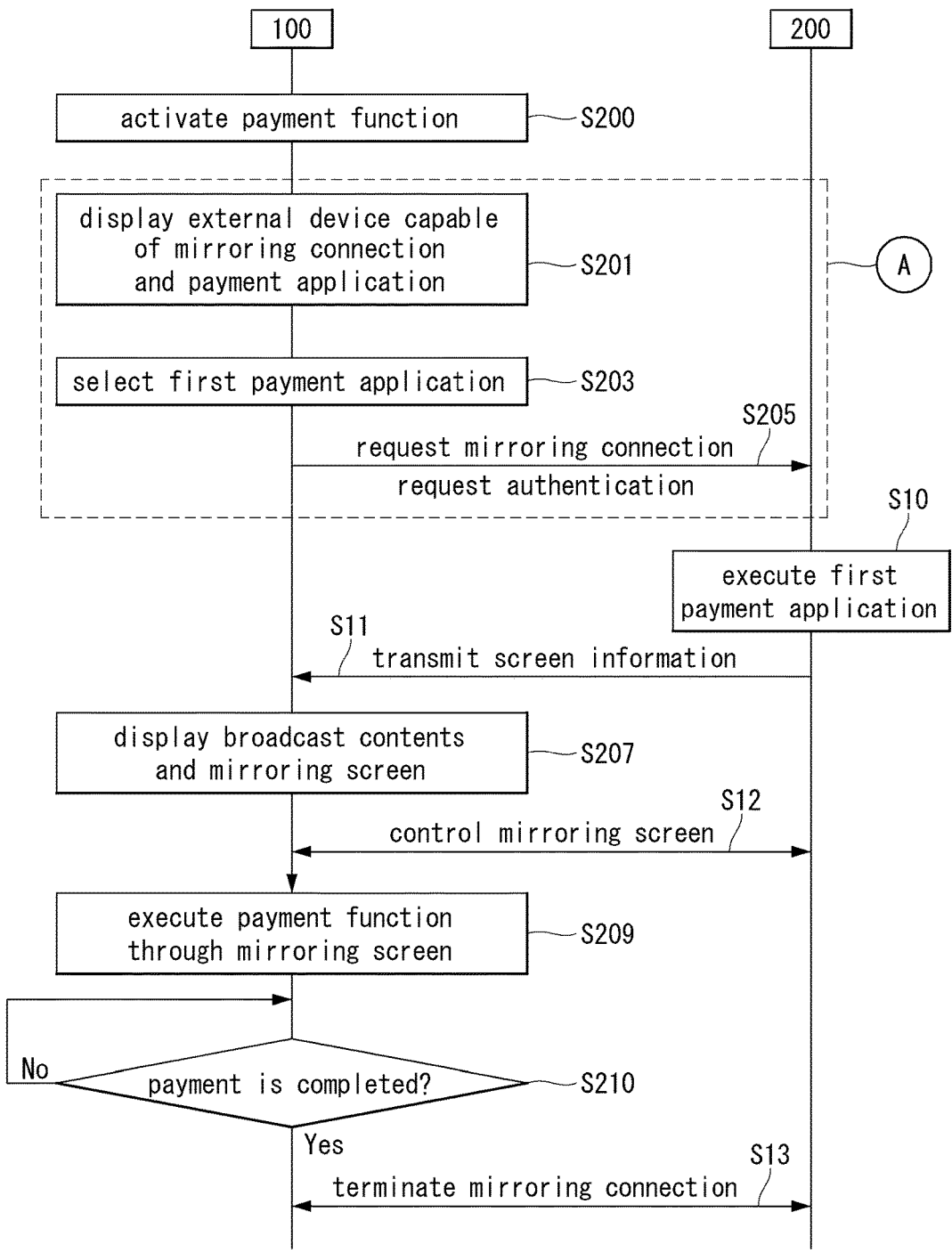
FIG. 9 is a flowchart of data between an electronic device and an external device connected to the electronic device by mirroring and a detailed flowchart for illustrating a method for controlling an electronic device according to an embodiment of the present invention.

FIG. 8 is a flowchart illustrating a method for controlling the electronic device according to an embodiment of the present invention. FIG. 9 shows a flow of data between the electronic device and an external device connected to the electronic device by mirroring and a detailed flowchart for illustrating the method for controlling the electronic device according to an embodiment of the present invention.

The method for controlling the electronic device according to an embodiment of the present invention may be implemented through the electronic device 100, the mobile terminal 200, and the wireless input device 300 described with reference to FIGS. 1 to 7. Hereafter, the method for controlling the electronic device according to an embodiment of the present invention and an operation of the electronic device 100 for implementing the method are described in detail with reference to corresponding drawings.

Referring to FIG. 8, the controller 180 of the electronic device 100 displays broadcast content (S100).

The controller 180 may receive a broadcast signal from a broadcasting station through the broadcast receiver 110 and display broadcast content corresponding to the received broadcast signal on the display unit 150. The broadcast content may include at least one of a terrestrial broadcast program, a cable broadcast program, and a broadcast program received from an Internet server. In addition, the broadcast program is a broadcast program for selling goods. A user may purchase goods at home through the broadcast program by immediately performing a payment for the goods that is broadcasted in the electronic device 100.

In general, if a user tries to purchase goods in a home shopping program broadcasted through TV, the user performs a process of purchasing the goods by inputting goods information, credit card information, or destination information using ARS or through a web browser associated with the home shopping program. In some embodiments, a user may use his or her mobile terminal as means for payment. For example, a user may perform functions, such as entering credit card numbers and performing authentication using a mobile terminal. In an embodiment of the present invention, however, a user performs a payment function through a mobile terminal, but may conveniently perform the payment function through only a manipulation of the wireless input device 300, which can eliminate the trouble of manipulating the mobile terminal and can control the electronic device 100 even in the state in which the user has not had the mobile terminal.

The controller 180 may activate the payment function of goods associated with the broadcast content through a remote signal received from the wireless input device 300 (S110).

For example, the broadcast content may provide a region for activating the payment function, together with information about target selling goods, to the display unit 150. The region for activating the payment function may be provided in a soft key form.

When the payment function is activated, the controller 180 receives the screen data of the first external device (S120). The controller 180 may display a mirroring screen, including a first payment application execution screen, on the display unit 150 (S121).

The controller 180 may execute the goods payment function through the remote signal received from the wireless input device 300 (S130).

That is, referring to FIG. 8, when the goods payment function is selected by a wireless remote controller while the home shopping program is broadcasted, the electronic device 100 receives screen data from a mobile terminal capable of being connected to the electronic device 100 by mirroring, and provides the mirroring screen of the mobile terminal. Thereafter, a user can pay for the goods by controlling the mirroring screen through the wireless remote control. That is, the user can pay for the goods provided by the broadcast content through only a manipulation of the wireless remote controller without any manipulation of the mobile terminal. In this case, the user does not manipulate the mobile terminal 200. In an embodiment of the present invention, the payment function is performed using a predetermined application installed on the mobile terminal 200 by mirroring the screen of the mobile terminal 200 into the display unit 150 of the electronic device 100. Hereafter, the method for controlling the electronic device according to an embodiment of the present invention is described in more detail with reference to FIG. 9 through a data transmission and reception process with the mobile terminal 200.

Referring to FIG. 9, the controller 180 of the electronic device 100 may activate the payment function of goods associated with broadcast content (S200). The controller 180 may activate the payment function displayed on the display unit 150 through control of the wireless input device 300.

The controller 180 may display at least one external device capable of a mirroring connection and a payment application which is installed on each external device and capable of performing the payment function on the display unit 150 (S201).

That is, the controller 180 may display an object corresponding to at least one external device capable of a mirroring connection and the icon of an available payment application installed on each external device in the vicinity of the object on the display unit 150.

The at least one external device may be a device having the history of a previous mirroring connection with the electronic device 100. In some embodiments, the controller 180 may register a new device as a device capable of a mirroring connection although the new device does not have the history of a previous mirroring connection with the electronic device 100. The registration of the new device may be performed through a user input. For example, if an HDMI terminal is connected through an interface, the controller 180 may search for devices capable of a mirroring connection. When a particular external device is selected, the controller 180 may recognize the particular external device as a device capable of a mirroring connection with the electronic device 100. In some embodiments, when the electronic device 100 is selected through Miracast in a particular external device without the intervention of the HDMI terminal, the controller 180 may register the particular external device as a device capable of a mirroring connection with the electronic device 100.

The controller 180 may select the first payment application of payment applications displayed on the display unit 150 in response to the control signal of the wireless input device 300 (S203). The first payment application corresponds to the first external device of the at least one external device displayed on the display unit 150.

The controller 180 may request a mirroring connection from the first external device 200. The controller 180 may also request an authentication procedure for the first external device 200 along with the mirroring connection request (S205).

The first external device 200 may execute the first payment application in response to the mirroring connection request (S10), and may display the execution screen of the first payment application on the display unit. At the same time, the first external device 200 transmits screen information to the electronic device 100 (S11).

The electronic device 100 that has received the screen information may display the same screen as the screen displayed on the display unit of the first external device 200 in one region of the display unit 150, and may display the existing broadcast content in the remaining regions of the display unit 150 (S207). That is, when the mirroring connection with the first external device is performed while the broadcast content is displayed, the controller 180 may display the broadcast content and the mirroring screen on one display unit 150.

The electronic device 100 may execute the payment function by controlling the execution screen of the first payment application, displayed on the mirroring screen, in response to a remote signal received through the wireless input device 300 (S209). The payment function is implemented through the first payment application driven in the first external device, but may look like as if it is executed through the electronic device 100 because the screen of the first external device is mirrored into the electronic device 100 and displayed.

When the payment is completed through the remote signal of the wireless input device, the controller 180 may terminate the mirroring connection with the first external device 200 (S13).

Accordingly, in an embodiment of the present invention, a user can purchase required goods in a home shopping program that is broadcasted through TV using only a wireless remote controller without manipulating the mobile terminal.

Hereinafter, the method for controlling the electronic device according to an embodiment of the present invention in connection with screen configurations of the electronic device 100 is described in detail.

Figure 11:
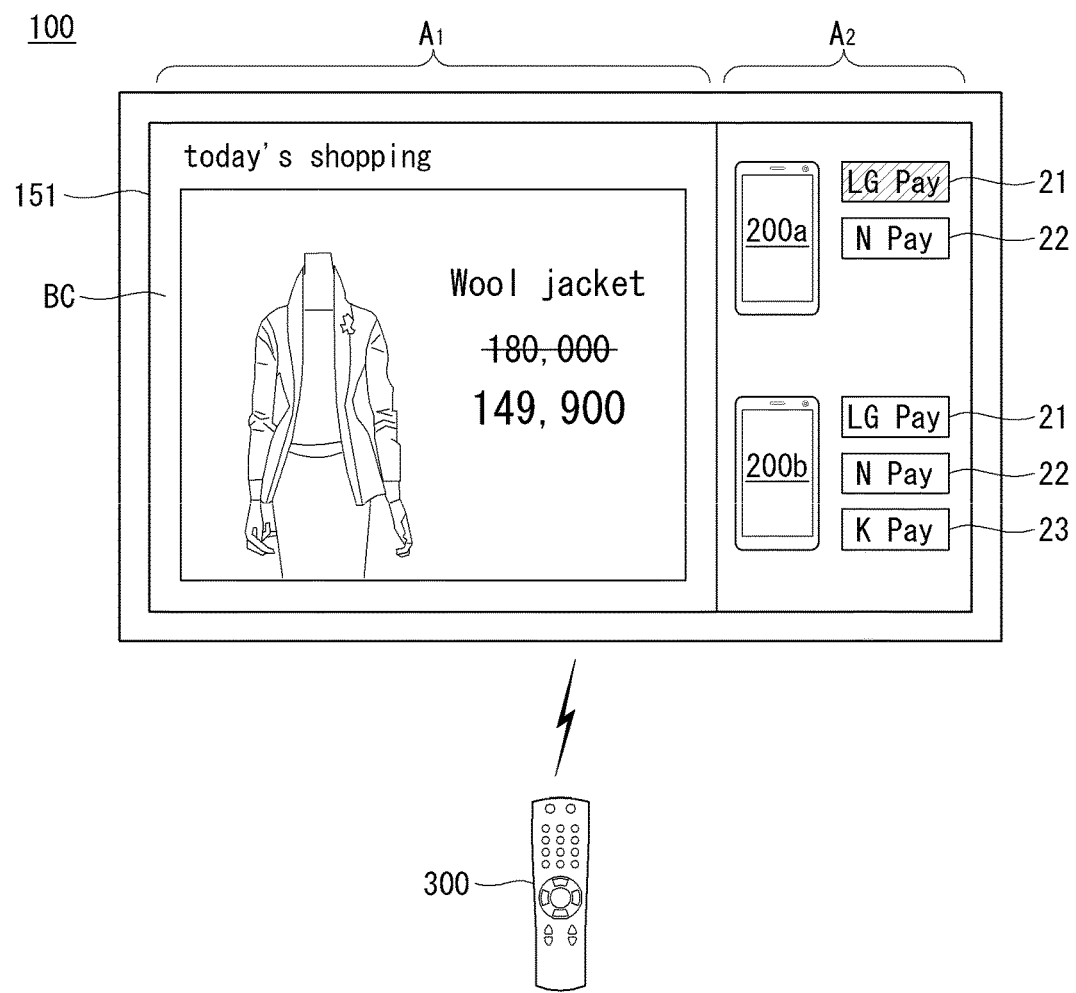

FIGS. 10 to 11 are diagrams for illustrating step S110 of FIG. 9.

Referring to FIG. 10, the control unit 180 displays broadcast content BC in the first region A1 of the display unit 151. The first region A1 may be the entire region of the display unit 151. That is, the first region A1 may be a region in which the broadcast content is displayed. The broadcast content may be content linked to a goods payment function. The thumbnails CH1, CH2, and CH3 of programs that are broadcasted in other broadcasting channels may be displayed in addition to the broadcast content linked to the goods payment function. The broadcast content linked to the goods payment function may include a buying button 10. When the buying button 10 is selected in response to the control signal of the wireless input device 300, the controller 180 may activate the goods payment function.

The activation of the goods payment function does not mean that the goods payment function is not immediately executed through specific payment means, but may mean that an interface through which an object of a mirroring connection (e.g., a device) and a specific one of one or more payment applications installed on the mirroring connection device can be selected is provided to the display unit 150.

Referring to FIG. 11, when the goods payment function is activated, the controller 180 may divide the display unit 150 into the first region A1 and a second region A2.

The first region A1 is a region in which the previously provided broadcast content BC is displayed. When the first region A1 is displayed along with the second region A2, it may be re-sized and displayed.

The second region A2 may display objects 200a and 200b corresponding to at least one external device capable of a mirroring connection and the icons 21, 22, and 23 of payment applications installed on the external devices. It may be seen that a first payment application 21 and a second payment application 22 are installed on the first external device 200a and the first payment application 21, the second payment application 22, and a third payment application 23 are installed on the second external device 200b.

The at least one external device capable of a mirroring connection is a device having the history of a previous mirroring connection with the electronic device 100. The electronic device 100 stores the history information. When the payment function is activated, the electronic device 100 may fetch at least one external device capable of a mirroring connection based on the history information.

The at least one external device capable of a mirroring connection may include devices which do not have the history of a mirroring connection with the electronic device 100 and which are newly registered. For example, although not shown in FIG. 11, the second region A2 may display an icon through which a new device capable of a mirroring connection may be registered. The new device may be registered by selecting the icon.

The payment application may be an application executed in connection with a messenger application. That is, the payment application may be implemented by a payment service provided by a messenger server. In order to provide a service corresponding to the payment function, the messenger server may operate in conjunction with a predetermined payment server. The payment server may include at least one financial server which is provided in a financial institution providing a predetermined financial service and which provides a mobile banking service.

The payment application may be an application which executes the payment function by directly accessing a financial server provided by a specific financial institution separately from the messenger application.

According to an embodiment of the present invention, when the first payment application 21 displayed on the display unit 150 of the electronic device 100 is selected, the electronic device 100 may perform the payment function by allowing the first payment application to be executed through the first external device. That is, the controller 180 sends a control signal that enables the first payment application to be executed in the first external device. In addition, the controller 180 receives screen information from the first external device, and provides a mirroring screen including the execution screen of the first payment application, to the display unit 150.

According to an embodiment of the present invention, a list of external devices capable of a mirroring connection displayed on the display unit 150 of the electronic device 100 may include a terminal owned by a user who watches the current broadcast, but may also include a list of terminals owned by other users. That is, the list may include a list of the terminals of other family members using TV. Accordingly, in an embodiment of the present invention, in order to perform the payment function after the terminal of a user himself or herself is recognized as a mirroring target, the electronic device 100 may perform an authentication process prior to a mirroring connection.

FIGS. 12A to 12C are diagrams for illustrating an authentication process for a mirroring connection with an external device.

When the icon of the first payment application is selected in response to the remote signal of the wireless input device 300, the control unit 180 provides a user interface for authenticating the first external device to the display unit 150. Thereafter, the controller 180 receives the authentication information according to the remote signal. If the received authentication information is identical with predetermined authentication information, the electronic device 100 and the first external device 200 are subjected to a mirroring connection. The control unit 180 receives the screen data of the first external device 200 and displays the mirroring screen on the display unit 150.

Referring to FIG. 12A, the authentication information received from the wireless input device 300 may be a password form 31. The mobile terminal 200 mirroring-connected to the electronic device 100 may receive a password by receiving the remote signal of the wireless input device 300 through the mirroring screen displayed on the display unit 150 of the electronic device 100.

Referring to FIG. 12B, the authentication information received from the wireless input device 300 may include specific pattern information 32 which is formed along the moving trajectory of the wireless input device 300.

Referring to FIG. 12C, the authentication information received from the wireless input device 300 may include user fingerprint information 33. As described above, the wireless input device 300 may include the touchpad 323c. The touch pad 323c includes a sensor for recognizing a fingerprint, and thus may recognize a user's fingerprint and send the recognized fingerprint information to the electronic device 100. The fingerprint information received from the wireless input device 300 may be displayed on the display unit 150. Authentication for the mobile terminal 200 may be performed by comparing the received fingerprint information with the user's fingerprint information previously registered with the mobile terminal 200.

According to an embodiment of the present invention, a point of time at which a screen of the mobile terminal 200 is mirrored and displayed on the display unit 150 of the electronic device 100 may be a point of time after the authentication procedure of FIGS. 12A to 12C is performed.

For example, a point of time at which the mobile terminal 200 is mirroring-connected to the electronic device 100 may be a point of time at which the first payment application displayed on the display unit 151 of the electronic device 100 is selected. That is, when the icon of the first payment application is selected, the two devices may be mirroring-connected, an interface for authentication may be displayed on a mirroring screen, and the authentication may be performed through the interface.

FIG. 13 is a diagram for illustrating step S120 of FIG. 9.

When the authentication for the mobile terminal 200 is performed through the wireless input device 300, the controller 180 receives the screen information from the first external device 200, processes the received screen information, and displays a mirroring screen corresponding to the first external device 200 on the display unit 150.

When the authentication process for the first external device 200a is completed, the controller 180 may display a mirroring screen MS, corresponding to an execution screen of the first payment application displayed on the external device 200a, in the second region A2 of the display unit 150. The controller 180 may perform the payment function for the goods displayed in the first region A1 by selecting any one of a payment menu 41 according to the entry of a password and an authentication payment menu 42, which are displayed in the mirroring screen MS, in response to the remote signal of the wireless input device 300.

In an embodiment of the present invention, the mirrored screen of the mobile terminal 200 is merely used in the electronic device 100 through the wireless input device 300, but there is no need for a user's direct manipulation for the mobile terminal 200. However, items displayed on the mirror screen MS in response to the execution of the payment application may include an additional input, such as destination information and a message. In the case of the destination information, for example, if items stored in the mobile terminal 200, such as an address, a telephone number, and a mail address, are used, the destination information may be inputted more conveniently in the electronic device 100.

Accordingly, an embodiment of the present invention provides a method capable of properly using other applications installed on the mobile terminal 100 when a user performs the payment function through the mirroring screen MS.

Figure 14A:
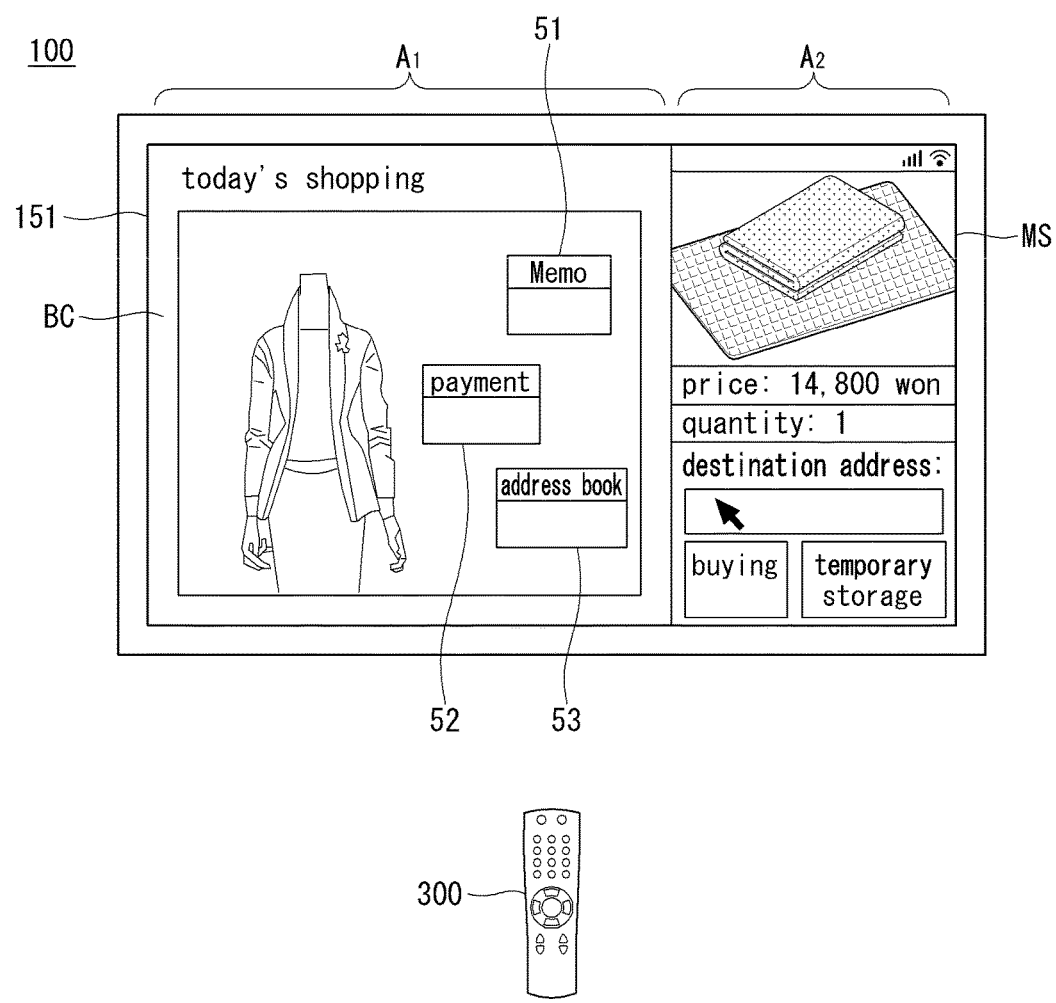

FIGS. 14A to 14B are diagrams for illustrating step S130 of FIG. 9.

Referring to FIG. 14A, there may be a situation in which destination information is inputted to the mirroring screen MS corresponding to an execution screen of the payment application. When a cursor placed in the destination input field of the mirroring screen MS is detected under the control of the wireless input device 300, the controller 180 may display one or more applications 51, 52, and 53 that belong to applications installed on the mirroring-connected external device 200a and that may be used for an input to the destination input field on the display section 151.

The controller 180 may display the one or more applications 51, 52, and 53 on the first region A1 regardless of the mirroring screen MS. That is, since the mirroring screen MS corresponds to a screen of the mobile terminal 200, the controller 180 may display the one or more applications 51, 52, and 53 in the first region A1 in which broadcast content is displayed separately from items displayed on the screen of the mobile terminal 200.

Referring to FIG. 14b, the controller 180 senses input for selecting the address book application 53 of the one or more applications 51, 52, and 53 in response to the remote signal of the wireless input device 300. The control unit 180 displays an execution screen of the address book application on the mirroring screen MS. When specific address information of one or more pieces of address information included in the address book is selected in response to the remote signal of the wireless input device 300, the controller 180 may display a payment application screen again instead of the address information included in the mirror screen MS. The selected specific address information is inputted and displayed in the destination input field of the payment application screen.

That is, according to an embodiment of the present invention, while a payment function is performed by mirroring an execution screen of the payment application of a mobile phone into TV, other applications of the mobile phone may also be used through control of the TV in order to input additional information used for the payment function.

According to an embodiment of the present invention, if the payment function is completed through mirroring screen, the mirroring connection may be automatically terminated.

Figure 15B:
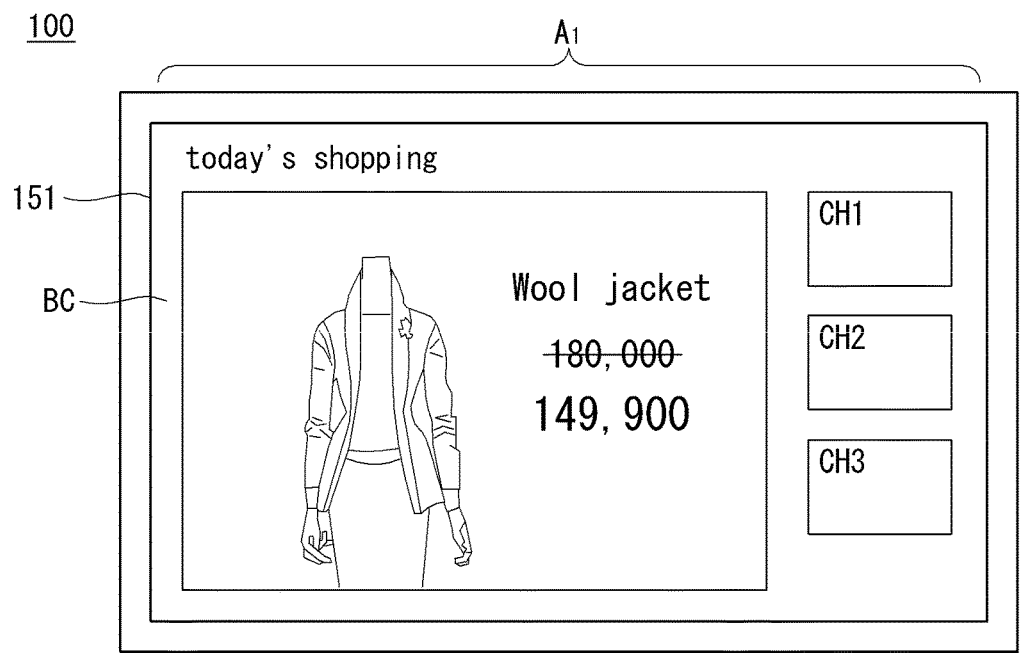
FIGS. 15A to 16 are diagrams for illustrating the operation of an electronic device after a payment function is complete and a mirroring connection is terminated according to an embodiment of the present invention.
Figure 16:
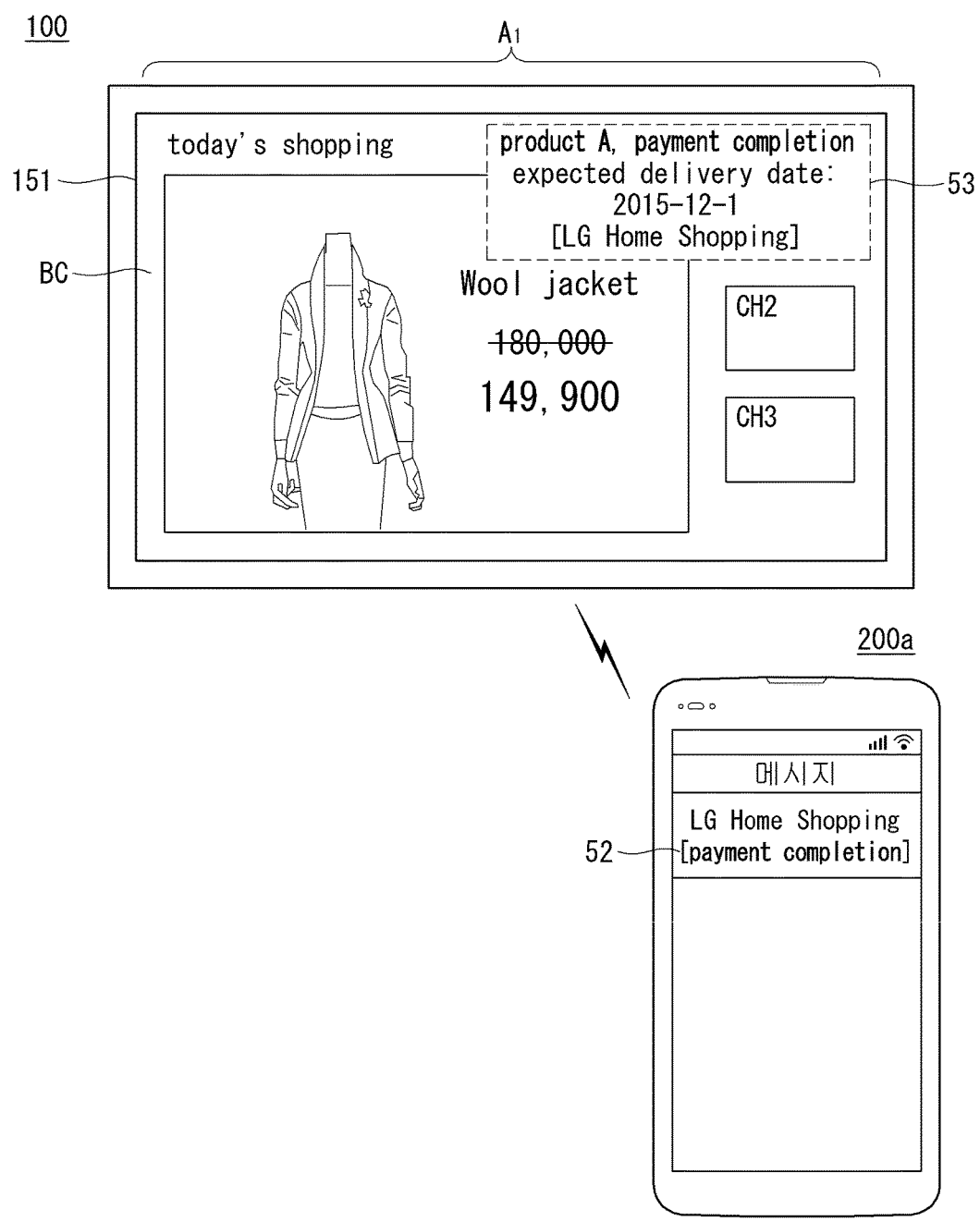

FIGS. 15A to 16 are diagrams for illustrating an operation of the electronic device after a payment function is complete and a mirroring connection is terminated according to an embodiment of the present invention.

Referring to FIG. 15A, when the payment function is complete through the mirroring screen displayed on the display unit 150 of the electronic device 100, the first external device 200a receives the payment completion message, and the icon of the received message is displayed on the screen of the first external device 200a. Accordingly, the icon of the payment completion message may be displayed on a mirroring screen displayed in the second region A2 of the display unit 150 of the electronic device 100. A user may recognize that the payment has been normally completed through the icon of the payment completion message displayed on the mirroring screen displayed on a TV screen although the first external device 200a is not present near the user.

Referring to FIG. 15B, the controller 180 may automatically terminate the mirroring connection when the payment function is complete. That is, when the payment function is complete, the mirroring connection may be automatically terminated in response to a control signal from the external device 200. When the mirroring connection is terminated, the control unit 180 may remove the second region A2 in which the mirroring screen MS is displayed, may extend the first region A1 in which the broadcast content is displayed to the full region of the display unit 150, and may display the first region A1 in the full region.

Referring to FIG. 16, the controller 180 may receive the payment completion message from the external device 200a and display the payment completion message in one region of the display unit 150. That is, when the payment function is completed through the mirroring screen displayed on the display unit 150 of the electronic device 100, the controller 180 may replace the entire second region A2 in which the mirroring screen MS is displayed with a first region A1. Thereafter, when the external device 200a receives a payment completion message 52, it may transmit the received payment completion message to the electronic device 100 with which the mirroring connection has been terminated, but with which the pairing state is maintained. The electronic device 100 may display a payment completion message 53 received from the external device 200a on the display unit 150. The controller 180 may provide the payment received message 53 in a pop-up form and remove it after a predetermined time elapses.

Figure 17B:
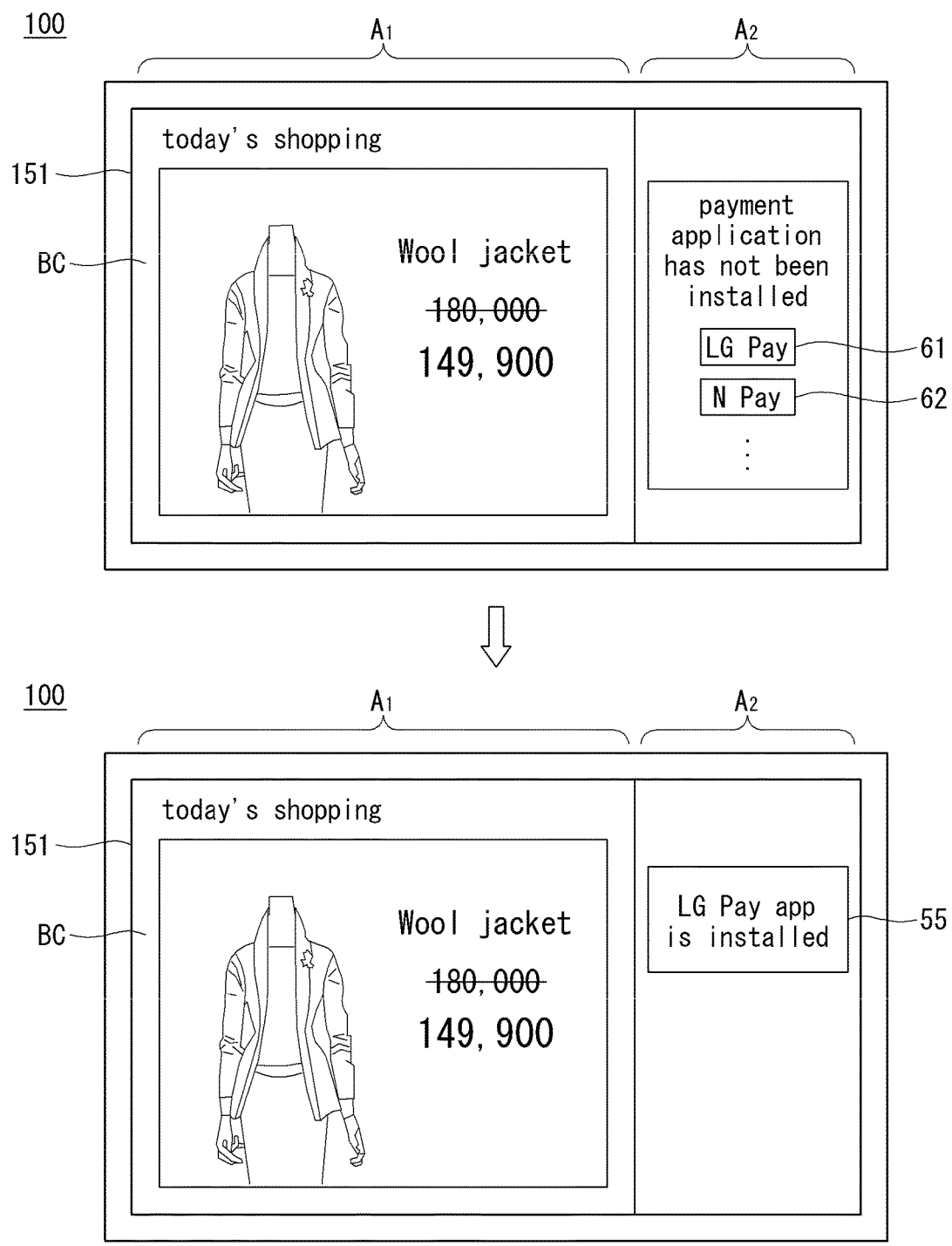

FIGS. 17A to 17B are diagrams for illustrating an operation of the electronic device according to another embodiment of the present invention.

Referring to FIG. 17A, when broadcast content BC is displayed and a goods payment function linked to the broadcast content is activated, the controller 180 of the electronic device 100 may divide a region into a first region A1 for displaying the broadcast content BC and a second region A2 for displaying a device for performing the payment function and payment applications on the display unit 150, and may display the first region and the second region. As shown in FIG. 17A, it may be seen that the icons of the payment applications are displayed near the external device object and thus a first payment application 21 and a second payment application 22 have been installed on the first external device 200a.

However, it may be seen that any payment application has not been installed on the second external device 200b because the icon of a payment application is not displayed near the second external device 200b. In this situation, when a user selects the second external device 200b, the controller 180 may recommend one or more payment applications 61 and 62 which may be installed on the second external device 200b through a remote signal from the wireless input device 300, as shown in FIG. 17B.

When the first payment application 61 is selected in response to the remote signal of the wireless input device 300, the control unit 180 transmits a control signal that enables the first payment application 61 to be installed on the second external device 200b to the second external device 200b. Furthermore, the control unit 180 displays a pop-up window 55 in the second region A2 of the display unit 150 so that the first payment application installed on the second external device 200b can be recognized.

The control signal may be a signal that enables the installation file of the first payment application 61 to be received from the application server to the second external device 200b and to be installed on the second external device 200b. When the first payment application 61 is automatically installed on the second external device 200b, the electronic device 100 may perform the goods payment function by controlling the first payment application, executed by the second external device 200b, through the mirroring screen.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (e.g., a transmission over the Internet). The processor may include the controller 180 of the mobile terminal.

The foregoing embodiments are merely exemplary and are not to be considered as limiting the present disclosure. The present teachings may be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

Accordingly, an object of the present invention is to address the above-noted and other problems.

An object of the present invention is to provide an electronic device and a control method of the electronic device that can perform payment functions in a more easy way through the electronic device.

In addition, an object of the present invention is to provide an electronic device and a control method of the electronic device that can perform payment functions in a more easy way in the electronic device using a mirroring screen by sharing the screen information of the portable terminal.

In addition, an object of the present invention is to provide an electronic device and a control method of the electronic device that can perform payment functions in a more easy way in the electronic device without using the portable terminal by providing a payment application installed on the mobile terminal to the electronic device through the mirroring screen.

An object of the present invention is not limited to the above mentioned object of the present invention. In addition, another object of the present invention will become apparent to those of ordinary skill in the art from the following description.

An electronic device in accordance with an aspect of the present invention comprises a display unit; and a controller configured to display broadcast content on the display unit, and control a display of the display unit through a remote signal received in a wireless input device, wherein when a payment function of goods associated with the broadcast content is activated by the remote signal, the controller is configured to display an execution screen on the display unit by mirroring the execution screen of a first payment application that is executed on a first external device and execute the payment function of goods by controlling a mirroring screen via the remote signal.

The controller, when the payment function is activated, may be configured to display an object corresponding to an at least one external device that a mirroring connection is possible and a payment application icon installed on the external device on the display unit.

The controller, when a first payment application icon is selected by the remote signal, may be configured to transmit a control signal such that the first payment application is executed in the first external device, receive screen information from the first external device, and display the mirroring screen on the display unit.

The controller, when the first payment application icon is selected by the remote signal, may be configured to provide a user interface for authentication for the first external device and, when receiving authentication information preset by the remote signal, display the mirroring screen on the display unit.

The authentication information may comprise at least one of password information, pattern information formed in accordance with moving trajectory of the wireless input device, fingerprint information of a user detected by the wireless input device, and biometric information.

The at least one external device may be configured to include a device having a history of mirroring connection with the electronic device.

The controller, when a payment application is not installed on a second external device corresponding to a selected object of an object corresponding to the at least one external device, may be configured to provide at least one payment application that can be installed on the second external device on the display unit and transmit a control signal, so that a selected second payment application is automatically installed on the second external device to the second external device.

The controller may be configured to execute the payment function of the goods by controlling the execution screen of the second payment application mirrored on the display unit by the remote signal.

The controller may be configured to display an icon of at least one application required for purchasing goods on the display unit through the execution screen of the first payment application with the mirroring screen.

The at least one application may comprise at least one of a memo application, an address book application, or a contact application.

The icon of the at least one application displayed may partially overlap with the broadcast content.

The controller, when the payment function of the goods is completed and a payment completion message is received by the first external device, may be configured to automatically terminate mirroring connection of the first external device and the display unit.

The controller may be configured to receive and display the payment completion message from the first external device on the display unit.

The controller may be configured to separate and display a first region for displaying broadcast content and a second region for displaying the object.

When the mirroring connection of the first external device and the electronic device is terminated, wherein the second region may be removed.

A method for controlling an electronic device according to another aspect of the present invention comprises displaying broadcast content on a display unit; receiving a remote signal by a wireless input device; activating a payment function of goods linked to the broadcast content via the remote signal; mirroring an execution screen of a first payment application that is executed on a first external device and displaying the execution screen on the display unit; controlling a mirroring screen through the remote signal and performing the payment function of the goods.

The method for controlling an electronic device further comprises if the payment function is activated, displaying the broadcast content in a first region of the display unit and an object corresponding to at least one external device capable of a mirroring connection and a payment application icon installed on the external device in a second region of the display unit; if the first payment application icon is selected by the remote signal, performing a mirroring connection with the first external device through a wireless communication unit; and displaying a mirroring screen by receiving a screen data from the first external device in the second region; wherein the mirroring screen may comprise the execution screen of the first payment application.

The method for controlling an electronic device further comprises automatically terminating the mirroring connection if a payment function of the goods is completed.

According to electronic device and control method of the electronic device according to an embodiment of the present invention, it has the following advantages.

According to the present invention, it may perform payment functions in a more easy way through the electronic device.

Furthermore, according to an embodiment of the present invention, it may perform payment functions in a more easy way in the electronic device using a mirroring screen by sharing the screen information of the mobile terminal.

Furthermore, according to an embodiment of the present invention, it may perform payment functions in a more easy way in the electronic device without using the portable terminal by providing the payment application installed on the mobile terminal through mirroring screen to the electronic device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device, comprising:
  a wireless receiving device to wirelessly receive remote signals from a wireless input device;
  a display; and
  a controller configured to display, on the display, broadcast content and to control the display based on the remote signals received from the wireless input device,
  wherein, the controller is further configured to:
    activate a payment function of goods associated with the broadcast content in response to receiving a first remote signal,
    display, on the display, at least one external device capable of a mirroring connection and at least one payment application that is installed on each external device,
    select a first payment application based on the remote signal received from the wireless input device, wherein the first payment application corresponds to a first external device of the at least one external device displayed on the display,
    mirror an execution screen of the first payment application executed at the first external device,
    display, on the display, a mirroring screen, and
    execute the payment function of the goods by controlling the mirroring screen by using the remote signal from the wireless input device,
    wherein the at least one external device and the at least one payment application are displayed on the display before a mirroring connection.

2. The electronic device of claim 1, wherein the controller is further configured to:
  transmit a control signal that enables the first payment application to be executed at the first external device in response to selection of the first payment application,
  receive screen information from the first external device, and
  display, on the display, the mirroring screen.

3. The electronic device of claim 2, wherein in response to the selection of the first payment application, the controller is configured to provide, at the display, a user interface for authentication for the first external device, and the controller is configured to display, on the display, the mirroring screen after receiving proper authentication information.

4. The electronic device of claim 3, wherein the authentication information includes at least one of password information, pattern information formed based on a moving trajectory of the wireless input device, user fingerprint information detected through the wireless input device, and biometric information.

5. The electronic device of claim 1, wherein the at least one external device includes a device having a history of a mirroring connection with the electronic device.

6. The electronic device of claim 1, wherein in response to selection of a second external device in which a payment application has not been installed, the controller is configured to provide, to the display, at least one payment application capable of being installed at the second external device and to transmit, to the second external device, a control signal that enables a selected second payment application to be automatically installed at the second external device.

7. The electronic device of claim 6, wherein the controller is configured to execute the payment function of the goods by controlling an execution screen of the second payment application mirrored at the display, wherein the execution screen of the second payment application is controlled based on the remote signal.

8. The electronic device of claim 1, wherein the controller is configured to simultaneously display, on the display, the mirroring screen and an icon of at least one application for goods payment through the execution screen of the first payment application.

9. The electronic device of claim 8, wherein the at least one application includes at least one of a memo application, an address book application, and a contact application.

10. The electronic device of claim 8, wherein the icon of the at least one application is displayed to at least partially overlap the displayed broadcast content.

11. The electronic device of claim 1, wherein in response to completion of the payment function of the goods and after the first external device receives a payment completion message, the controller is configured to automatically terminate the mirroring connection of the first external device and the display.

12. The electronic device of claim 11, wherein the controller is configured to receive the payment completion message from the first external device and to display, on the display, the received payment completion message.

13. The electronic device of claim 1, wherein the controller is configured to divisively display a first region for displaying the broadcast content and a second region for displaying an object.

14. The electronic device of claim 13, wherein the second region is removed from the display when the mirroring connection of the first external device and the electronic device is terminated.

15. A method for controlling an electronic device, the method comprising:
displaying broadcast content on a display;
receiving a remote signal from a wireless input device;
in response to receiving the remote signal, activating a payment function of goods linked to the broadcast content;
displaying at least one external device capable of a mirroring connection and at least one payment application that is installed on each external device,
selecting a first payment application based on the remote signal received from the wireless input device, wherein the first payment application corresponds to a first external device of the at least one external device displayed on the display,
mirroring an execution screen of the first payment application that is executed at a first external device,
displaying, on the display, the mirroring screen, and
executing the payment function of the goods by controlling the mirroring screen by using the remote signal received from the wireless input device,
wherein the at least one external device and the at least one payment application are displayed on the display before a mirroring connection.

16. The method of claim 15, further comprising:
when the payment function is activated, displaying, in a first region, the broadcast content and displaying, in a second region, an object corresponding to the at least one external device and an icon of a payment application installed at the external device;
in response to receiving a selection of an icon of the first payment application based on the remote signal, performing a mirroring connection with the first external device through a wireless communication device of the electronic device; and
receiving screen data from the first external device and displaying, in the second region, the mirroring screen,
wherein the mirroring screen includes the execution screen of the first payment application.

17. The method of claim 16, further comprising automatically terminating the mirroring connection when the payment function of the goods is completed.

18. The method of claim 15, wherein in response to selection of a second external device in which a payment application has not been installed, displaying at least one payment application capable of being installed at the second external device and transmitting, to the second external device, a control signal that enables a selected second payment application to be automatically installed at the second external device.

19. The electronic device of claim 18, further comprising controlling an execution screen of the second payment application mirrored at the display, wherein the execution screen of the second payment application is controlled based on the remote signal.

* * * * *